United States Patent
Gupta et al.

(10) Patent No.: US 8,942,636 B2
(45) Date of Patent: Jan. 27, 2015

(54) ADAPTIVE TRANSMISSION OF RESOURCE UTILIZATION MESSAGES BASED ON THROUGHPUT

(75) Inventors: Rajarshi Gupta, San Diego, CA (US); Gavin Bernard Horn, La Jolla, CA (US); Anastasios Stamoulis, San Diego, CA (US); Ashwin Sampath, Princeton, NJ (US); Santosh Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1004 days.

(21) Appl. No.: 12/021,215

(22) Filed: Jan. 28, 2008

(65) Prior Publication Data
US 2009/0191817 A1    Jul. 30, 2009

(51) Int. Cl.
*H04B 7/00* (2006.01)
*H04W 52/24* (2009.01)
(Continued)

(52) U.S. Cl.
CPC ............ *H04W 52/243* (2013.01); *H04W 28/24* (2013.01); *H04W 24/02* (2013.01); *H04W 52/146* (2013.01); *H04W 52/248* (2013.01)
USPC .......... 455/63.3; 455/62; 455/63.1; 455/66.1; 455/67.11; 455/67.13; 455/69; 455/91; 455/437; 455/452.2; 455/513; 370/280; 370/468; 370/329; 370/241; 370/230; 375/260; 375/135; 375/222; 375/133

(58) Field of Classification Search
USPC .......... 455/62, 63.1, 63.3, 66.1, 67.11, 67.13, 455/69, 91, 437, 452.2, 513, 450, 449; 370/280, 468, 329, 241, 230; 375/260, 375/135, 222, 133
See application file for complete search history.

(56) References Cited

U.S. PATENT DOCUMENTS 5,583,869 A * 12/1996 Grube et al. .................. 370/347
6,124,226 A * 9/2000 Nielsen et al. ................... 502/9
(Continued)

FOREIGN PATENT DOCUMENTS

CN      1136375 A    11/1996
CN      1859350 A    11/2006
(Continued)

OTHER PUBLICATIONS

International Search Report—PCT/US08/052717—International Search Authority, European Patent Office—Oct. 13, 2008.
(Continued)

*Primary Examiner* — Ganiyu A Hanidu
(74) *Attorney, Agent, or Firm* — Joseph S. Hanasz

(57) ABSTRACT

An adaptive scheme controls the transmission of interference management messages by wireless nodes. For example, the adaptive scheme may be used to determine whether and/or how to transmit resource utilization messages. Such a determination may be based on, for example, comparison of a quality of service threshold with a current quality of service level associated with received data. A quality of service threshold may be adapted based on the effect of previously transmitted resource utilization messages. A quality of service threshold for a given wireless node may be adapted based on the frequency at which the wireless node transmits resource utilization messages. A quality of service threshold for a given wireless node may be adapted based on information received from another wireless node. An adaptation scheme also may depend on the type of traffic received by a given wireless node. A quality of service threshold also may be adapted based on throughput information.

36 Claims, 11 Drawing Sheets

(51) Int. Cl.
*H04W 28/24* (2009.01)
*H04W 24/02* (2009.01)
*H04W 52/14* (2009.01)

(56) References Cited

U.S. PATENT DOCUMENTS

| | | | |
|---|---|---|---|
| 6,459,901 B1* | 10/2002 | Chawla et al. | 455/450 |
| 7,177,648 B2* | 2/2007 | Attar et al. | 455/452.2 |
| 7,974,253 B2* | 7/2011 | Laroia et al. | 370/342 |
| 8,139,528 B2 | 3/2012 | Gupta et al. | |
| 8,219,042 B2* | 7/2012 | Nakashima et al. | 455/101 |
| 8,543,685 B1* | 9/2013 | Gormley | 709/224 |
| 8,611,399 B2* | 12/2013 | Myers et al. | 375/150 |
| 8,620,325 B2* | 12/2013 | Montemurro et al. | 455/437 |
| 2002/0160799 A1 | 10/2002 | Kanemoto et al. | |
| 2002/0173315 A1* | 11/2002 | Chmaytelli et al. | 455/453 |
| 2003/0103470 A1* | 6/2003 | Yafuso | 370/282 |
| 2003/0123477 A1* | 7/2003 | Gollamudi et al. | 370/465 |
| 2003/0198183 A1* | 10/2003 | Henriques et al. | 370/229 |
| 2004/0022213 A1 | 2/2004 | Choi et al. | |
| 2004/0202136 A1* | 10/2004 | Attar et al. | 370/333 |
| 2004/0259560 A1* | 12/2004 | Hosein et al. | 455/452.1 |
| 2005/0185737 A1 | 8/2005 | Yamauchi | |
| 2005/0201296 A1* | 9/2005 | Vannithamby et al. | 370/241 |
| 2006/0079221 A1* | 4/2006 | Grant et al. | 455/423 |
| 2006/0171357 A1* | 8/2006 | King et al. | 370/331 |
| 2006/0203727 A1* | 9/2006 | Aizawa et al. | 370/235 |
| 2006/0211441 A1* | 9/2006 | Mese et al. | 455/522 |
| 2006/0285504 A1* | 12/2006 | Dong et al. | 370/254 |
| 2007/0105574 A1* | 5/2007 | Gupta et al. | 455/509 |
| 2007/0105576 A1 | 5/2007 | Gupta et al. | |
| 2007/0223415 A1 | 9/2007 | Ji | |
| 2008/0189416 A1* | 8/2008 | Yamada et al. | 709/226 |
| 2008/0247314 A1 | 10/2008 | Kim et al. | |
| 2009/0016220 A1 | 1/2009 | Uysal et al. | |
| 2009/0022173 A1 | 1/2009 | Horn et al. | |
| 2009/0036062 A1* | 2/2009 | Tanaka et al. | 455/69 |
| 2009/0163223 A1 | 6/2009 | Casey | |

FOREIGN PATENT DOCUMENTS

| | | |
|---|---|---|
| EP | 1549004 | 6/2005 |
| EP | 1549004 A2 | 6/2005 |
| EP | 1780904 | 5/2007 |
| EP | 1780904 A1 | 5/2007 |
| JP | 2001274748 | 10/2001 |
| JP | 2005229570 A | 8/2005 |
| JP | 2007006231 A | 1/2007 |
| JP | 2009513061 A | 3/2009 |
| JP | 2009514441 | 4/2009 |
| WO | 2007046758 | 4/2007 |
| WO | 2007051140 | 5/2007 |

OTHER PUBLICATIONS

Written Opinion—PCT/US08/052717—International Search Authority, European Patent Office—Oct. 13, 2008.
European Search Report—EP08006297 Search Authority—Munich Patent Office Oct. 6, 2008.
European Search Report—EP08006473 Search Authority—Munich Patent Office Jan. 27, 2009.
International Search Report and Written Opinion—PCT/US2008/052715, International Searching Authority—European Patent Office, Feb. 2, 2009.
International Search Report and Written Opinion—PCT/US2008/052717, International Searching Authority—European Patent Office, Oct. 13, 2008.
Taiwan Search Report—TW097114682—TIPO—Sep. 14, 2011.

* cited by examiner

ADAPTIVE TRANSMISSION OF RESOURCE UTILIZATION MESSAGES BASED ON THROUGHPUT

CROSS-REFERENCE TO RELATED APPLICATION

This application is related to concurrently filed and commonly owned U.S. patent application Ser. No. 12/021,178, entitled "ADAPTIVE TRANSMISSION OF RESOURCE UTILIZATION MESSAGES," the disclosure of which is hereby incorporated by reference herein.

BACKGROUND

1. Field

This application relates generally to wireless communication and more specifically, but not exclusively, to an adaptive scheme for transmitting resource utilization messages.

2. Introduction

Deployment of a wireless communication system typically involves implementing some form of interference mitigation scheme. In some wireless communication systems, interference may be caused by neighboring wireless nodes. As an example, in a cellular system wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U.S. Patent Application Publication No. 2007/0105574, the disclosure of which is hereby incorporated by reference, describes a system where fair-sharing of a wireless channel may be facilitated by joint scheduling of a transmission by transmitting and receiving nodes through the use of a resource utilization message ("RUM"). Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a RUM in an attempt to cause the neighboring transmitting nodes to limit their interfering transmissions. According to related aspects, a RUM may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a RUM may utilize the fact that it has received a RUM, as well as the weight thereof, to determine an appropriate response. For example, the transmitting node may elect to abstain from transmitting, may reduce its transmit power during one or more designated timeslots, or may ignore the RUM. The advertisement of the RUMs and associated weights may thus provide a collision avoidance scheme that is fair to all nodes in the system.

SUMMARY

A summary of sample aspects of the disclosure follows. It should be understood that any reference to the term aspects herein may relate to one or more aspects of the disclosure.

The disclosure relates in some aspects to attempting to achieve an optimum level of performance in a wireless communication system. Here, system performance may relate to utilization of wireless resources (e.g., spectral efficiency), quality of service ("QoS"), or some other performance-related criteria.

The disclosure relates in some aspects to mitigating interference in a wireless communication system. For example, in some aspects an adaptive scheme is utilized to control the transmission of interference management messages (e.g., resource utilization messages) by wireless nodes.

Here, the adaptive scheme may be used to determine whether and/or how to transmit the resource utilization messages. Such a determination may be based on, for example, comparison of a threshold representative of a desired level of quality of service with a current level of quality of service associated with received data. For example, resource utilization messages may be transmitted if the current quality of service level falls below this quality of service threshold. Here, quality of service may relate to data throughput, data latency, interference, or some other related parameter.

In some aspects a quality of service threshold may be adapted based on the effect of previously transmitted resource utilization messages. For example, in the event the previous transmission of resource utilization messages by a wireless node improved a quality of service level at that node, the quality of service threshold may be increased. In this way, the wireless node may potentially transmit resource utilization messages more often in an attempt to improve the quality of service at that wireless node. Conversely, if the transmission of resource utilization messages did not improve the quality of service, the wireless node may lower the threshold so that fewer resource utilization messages are transmitted.

In some aspects a quality of service threshold for a given wireless node may be adapted based on the frequency at which the wireless node transmits resource utilization messages. For example, if there is an increase in the frequency of resource utilization message transmissions, the quality of service threshold may be decreased. In this way, the wireless node elects to transmit fewer resource utilization messages since the transmission of a large number of resource utilization messages may not proportionally improve the quality of service level at the wireless node, yet may adversely affect the availability of system resources for other nodes.

In some aspects a quality of service threshold for a given wireless node may be adapted based on information received from another wireless node. For example, a first wireless node may adapt its quality of service threshold based on information it receives from a second wireless node relating to resource utilization messages received by the second wireless node. As another example, a first wireless node may adapt its quality of service threshold based on information (e.g., transmit-side resource utilization messages) it receives from a neighboring transmitting node regarding transmissions by that transmitting node.

In some aspects different adaptation schemes are employed for different types of traffic received by a given wireless node. For example, a quality of service threshold for one type of traffic may be adapted in a different manner than a quality of service threshold for another type of traffic.

In some aspects a quality of service threshold may be adapted based on throughput information. For example, a quality of service threshold may be set to a median of the throughput rates of all of the wireless nodes in the associated wireless sector. Alternatively, a quality of service threshold may be set to a median of the median throughput rates of a set of neighboring wireless sectors.

BRIEF DESCRIPTION OF THE DRAWINGS

These and other sample aspects of the disclosure will be described in the detailed description and the appended claims that follow, and in the accompanying drawings, wherein:

Figure 1:
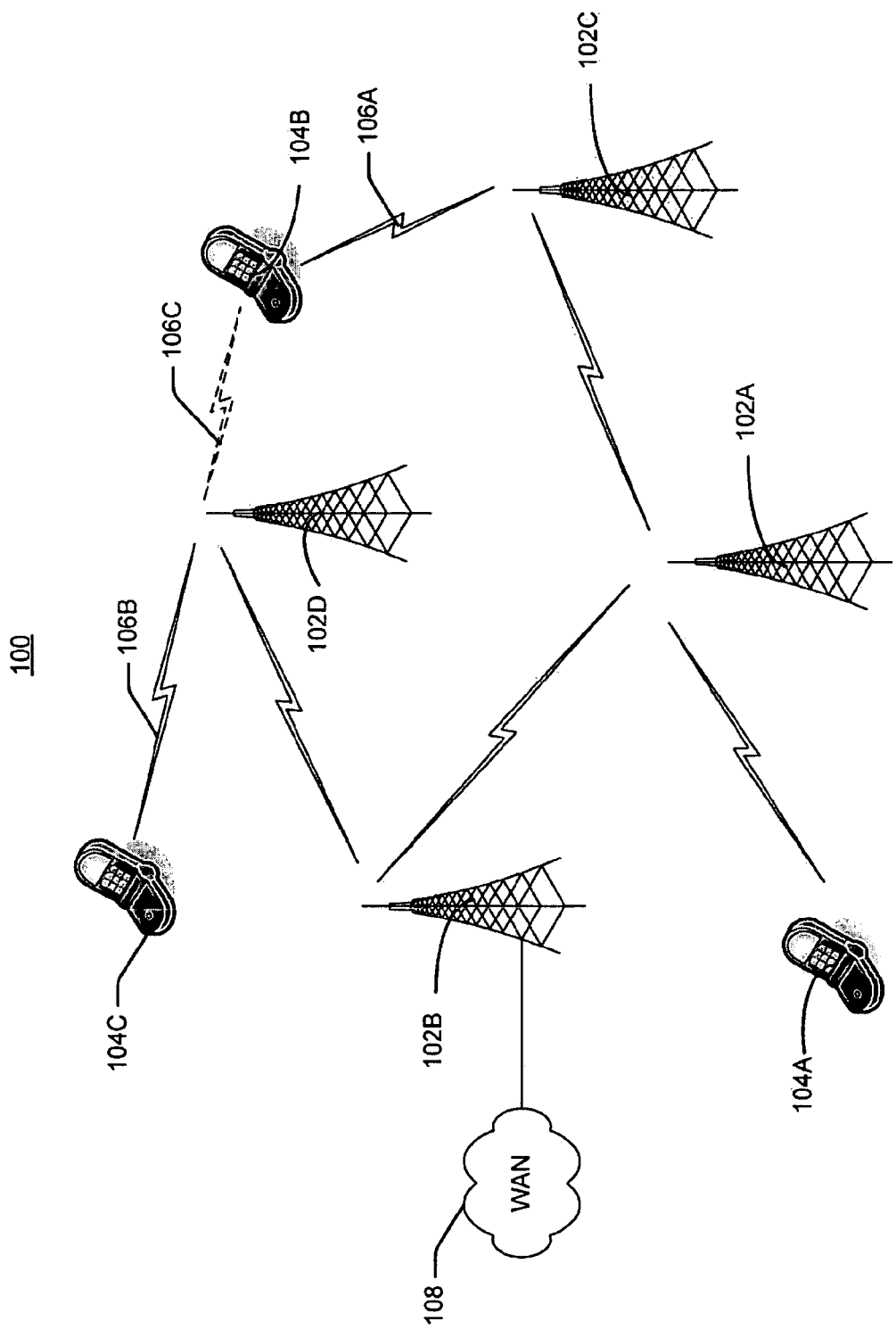
FIG. 1 is a simplified diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication may comprise adapting a quality of service threshold based on a set of resource utilization messages. In addition, in some aspects the adaptation of the quality of service threshold may cause more frequent transmissions of resource utilization messages if the transmission of resource utilization messages improves quality of service associated with data flows.

FIG. 1 illustrates several sample aspects of a wireless communication system 100. The system 100 includes several wireless nodes, generally designated as nodes 102 and 104. A given node may receive and/or transmit one or more traffic flows (e.g., data flows). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, a relay point, or an access point. Referring to FIG. 1, the nodes 102 may comprise access points or relay points and the nodes 104 may comprise access terminals. In some implementations the nodes 102 facilitate communication between the nodes of a network (e.g., a Wi-Fi network, a cellular network, or a WiMax network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the nodes (e.g., node 102B) may comprise a wired access point that provides connectivity to another network or networks (e.g., a wide area network such as the Internet).

In some aspects two or more nodes of the system 100 (e.g., nodes of a common independent service set) associate with one another to establish traffic flows between the nodes via one or more communication links. For example, the nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some cases, several nodes in the system 100 may attempt to transmit at the same time (e.g., during the same timeslot). Depending on the relative locations of the transmitting and receiving nodes and the transmit power of the transmitting nodes, it may be possible to reliably conduct such concurrent communications. Under these circumstances, the wireless resources of the system 100 may be well utilized as compared to, for example, a system that simply uses a carrier sense multiple access ("CSMA") mode of operation.

Under other circumstances, however, wireless transmissions from a node in the system 100 may interfere with reception at a non-associated node in the system 100. For example, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power of the node 102D, transmissions from the node 102D (as represented by a dashed symbol 106C) may interfere with reception at the node 104B.

To mitigate interference such as this, the nodes of a wireless communication system may employ an inter-node messaging scheme. For example, a receiving node that is experiencing interference may transmit a resource utilization message ("RUM") to indicate that the node is disadvantaged in some way. A neighboring node that receives the RUM (e.g., a potential interferer) may elect to limit its future transmissions in some way to avoid interfering with the RUM-sending node (i.e., the receiving node that sent the RUM). Here, a decision by a receiving node to transmit a RUM may be based, at least in part, on quality of service associated with data received at that node. For example, a receiving node may transmit a RUM in the event the current level of quality of service for one or more of its links or flows falls below a desired quality of service level. Conversely, the node may not transmit a RUM if the quality of service is acceptable.

In the discussion that follows, a quality of service level that that is used to determine whether to transmit RUMs may be referred to as a RUM sending threshold ("RST"). For example, in some implementations a node may send a RUM in the event the quality of service associated with one or more links or data flows of the node falls below a designated RST value.

In practice, a node may have several links that are active at the same time. In this case, the node may send a single RUM based on the quality of service of all of the links. For example, in some implementations a node (or, in some cases, an access point associated with the node) may define an RST for each of the node's links. The node may thus determine a quality of service metric for each link and compare each quality of service metric with a corresponding RST. A decision to send a RUM may then be based on whether any one of the links is not meeting its desired quality of service. Here, the weighting factor (i.e., weight) accorded the RUM may correspond to the weight of the most disadvantaged link (e.g., the highest of the weights).

It should be appreciated that other RUM sending schemes may be employed when a node has several active links. For example, a node may transmit RUMs for each link, a node may provide a collective quality of service metric and RST for all of the links, or the node may send RUMs based on other criteria such as data throughput, data latency, interference, or some other related parameter.

In the event a node has several active flows, the node (or associated access point if the node is an access terminal) may define an RST for each flow. For example, a voice call may be associated with an RST of 40 kbps, while a video call may have an RST of 200 kbps. Here, the RST may be normalized over the bandwidth used by the system. When a flow is introduced in the network, each link in its path may be augmented by its RST. Thus the RST of a link may be the sum of the RSTs of all the flows that pass through it. The weight of the RUM may then be calculated as discussed above.

In some implementations a node may elect to send a RUM if any one of its flows is not meeting its desired quality of service. In this case, a node may determine a quality of service metric for each flow and compare each quality of service metric with a corresponding RST. Here, the weight accorded the RUM may correspond to the weight of the most disadvantaged flow (e.g., the highest of the weights).

Again, it should be appreciated that other RUM sending schemes may be employed here. For example, a node may transmit RUMs for each flow, a node may provide a collective quality of service metric and RST for all of the flows, or the node may send RUMs based on other criteria.

If the RSTs of the nodes in a system are reasonably achievable, the RUM scheme may ensure that all of the links in the system achieve their desired quality of service. Here, any extra resources may be utilized by the links with a good carrier-to-interference ratio ("C/I"). In other words, these links may achieve quality of service levels (e.g., throughput levels) that are higher than their desired quality of service.

In contrast, if the RSTs are set to inappropriate levels, the system may settle at a sub-optimal equilibrium. The function of an RST for a node may, in a sense, be interpreted in two ways. To media access control ("MAC") and higher layers, the RST may function as a metric of the quality of service that is desired for one or more links or flows. To the physical ("PHY") layer, the RST may function as a value that causes a node to switch from simultaneous sharing of the channel to, for example, CSMA-like access where each node shuts off all its neighbors. In some cases, these two functions of RST are in conflict with one another. As a result, the transmission of RUMs by nodes in a system may benefit the corresponding nodes under some circumstances, but not in all circumstances (e.g., when the transmission of RUMs adversely affects the overall performance of the system). A few specific examples follow relating to issues that may arise in conjunction with selecting proper RSTs.

If the RSTs are set to unachievable levels (e.g., they are set too high), some or all of the links may always be disadvantaged. As a result, the corresponding receiving nodes may continually send out RUMs. This, in turn, may shut down or limit transmissions by other nodes in the system, thereby bringing down the overall throughput of the system. Here, when a large number of nodes are continually sending RUMs, the system effectively operates in a CSMA mode of operation. In some cases, due to the weights associated with the RUMs, the system may still achieve a relatively fair allocation of the resources between nodes (e.g., as indicated by the ratio of the RSTs), even though overall system throughput is less than optimum. In practice, however, a more optimal level of system performance may be achieved by providing some degree of resource sharing. For example, by sharing resources, it may be possible to achieve improvements both in the cumulative quality of service of the system and the quality of service at each node (or of each link, flow, etc) in the system.

In some cases a node may be unable to meet its desired quality of service even after sending RUMs. This condition may occur, for example, because the transmitting and receiving nodes are so far apart that the desired rates cannot be met, even with negligible interference. This condition also may occur, for example, when there are too many access terminals connected to an access point. In this case, the traffic load itself may become the bottleneck. In such cases, it may prove beneficial to drop the quality of service (e.g., by lowering RST) for one or more nodes, links, flows, etc., to limit the number of RUMs transmitted by these nodes, and thereby improve quality of service for other nodes, links, flows, etc., in the system.

In cases where the RSTs in the system are set too low, all or most of the links in the system will always achieve their desired quality of service. In this case, the nodes will not send out any RUMs. Consequently, the nodes will be free to transmit simultaneously. In this case, the throughput that is achieved in the system will be interference-limited. Depending on the location and interference environment of the nodes, this may yield an unfair distribution of resources.

Proper selection of an RST also may depend on the types of traffic carried by the system. For example, to ensure reliable operation of fixed rate traffic channels (e.g., control channels), a specific throughput may need to be maintained. Also, certain nodes may have higher traffic requirements because they may be aggregating a large amount of traffic. This may be particularly true if a wireless backhaul is used in a tree like architecture and a node that is close to the root of the tree is being scheduled. Accordingly, from a peak-rate perspective or for delay-intolerant service, it may be beneficial to allow a node to burst at a rate higher than what that node could otherwise achieve with simultaneous transmissions.

In view of the above, from a system efficiency standpoint, it may be desirable for the nodes of a system to set their respective RSTs to favor simultaneous transmissions or collision avoidance depending on which mode achieves the best system performance under current conditions. Accordingly, the wireless nodes in a system or associated access points may be configured to dynamically adapt the respective RSTs based on, for example, congestion feedback from the network. Here, by changing RST, the ability of a node, link, flow, etc., may be altered to contend during periods of congestion.

The adaptation of an RST for a given node or several nodes may affect system performance in different ways under different circumstances. In some aspects, adaptation of an RST for a given node in the system may improve the quality of service for data received by that node. For example, in some cases increasing an RST may cause a node to send more RUMs, thereby increasing the likelihood that the node will have more access to system resources (e.g., timeslots). In some aspects the adaptation of the RSTs of the nodes in a system may improve the overall performance (e.g., throughput, spectral efficiency, etc.) of the system. For example, when the transmission of RUMs is not improving quality of service at a given node to an appreciable degree, it may be more advantageous from a system perspective to reduce the RST at that node to enable other nodes in the system to gain more access to system resources.

As mentioned above, quality of service may relate to throughput, latency, interference (e.g., C/I), or some other suitable parameter. Consequently, in some aspects an RST may define a minimum data throughput rate that is desired for one or more data links or data flows. In some aspects an RST may define a maximum data propagation latency period that is desired for one or more data links or data flows. In some aspects a threshold value may define a maximum level of interference that is acceptable for one or more data links or data flows.

In some aspects, an RST may be normalized. For example, an RST throughput value may be defined in terms of normalized bits (e.g., corresponding to b/s/Hz). As a specific example, an RST of 0.4 b/s/Hz computed over a 20 MHz channel and a 1 ms timeslot size implies that the link desires a quality of service of $0.4 \times 20 \times 10^6 \times 1 \times 10^{-3} = 8000$ bits every timeslot.

An initial value for RST may be selected based on various criteria. For example, for applications that require a minimum quality of service (e.g., maximum latency or minimum throughput), an initial RST may be based on this criteria.

In some applications, an initial RST value may be set based on an estimate of an acceptable level of quality of service that is expected to be achievable in the system. For example, an initial RST value may be defined in a similar manner as forward link edge spectral efficiency is defined in planned cellular systems where the cell edge spectral efficiency indicates the throughput that an edge user terminal would achieve if the base transceiver station were to transmit to that user terminal, with the neighboring user terminals being on all the time. Cell edge geometries in planned CDMA systems may range from, for example, around −6 dB to −10 dB. Assuming a 4 dB gap to capacity, cell edge spectral efficiencies may thus be defined in the range of 0.05 to 0.1 b/s/Hz.

In an RST-based system, a node may transition to a collision avoidance mode in the event the throughput with simultaneous transmissions is worse than the throughput specified by the initial RST value. Here, switching to a collision avoidance mode may not necessarily yield the desired throughput because that minimum throughput may be unachievable. However, collision avoidance may yield a better throughput than the throughput that may be achieved using simultaneous transmissions.

Figure 2:
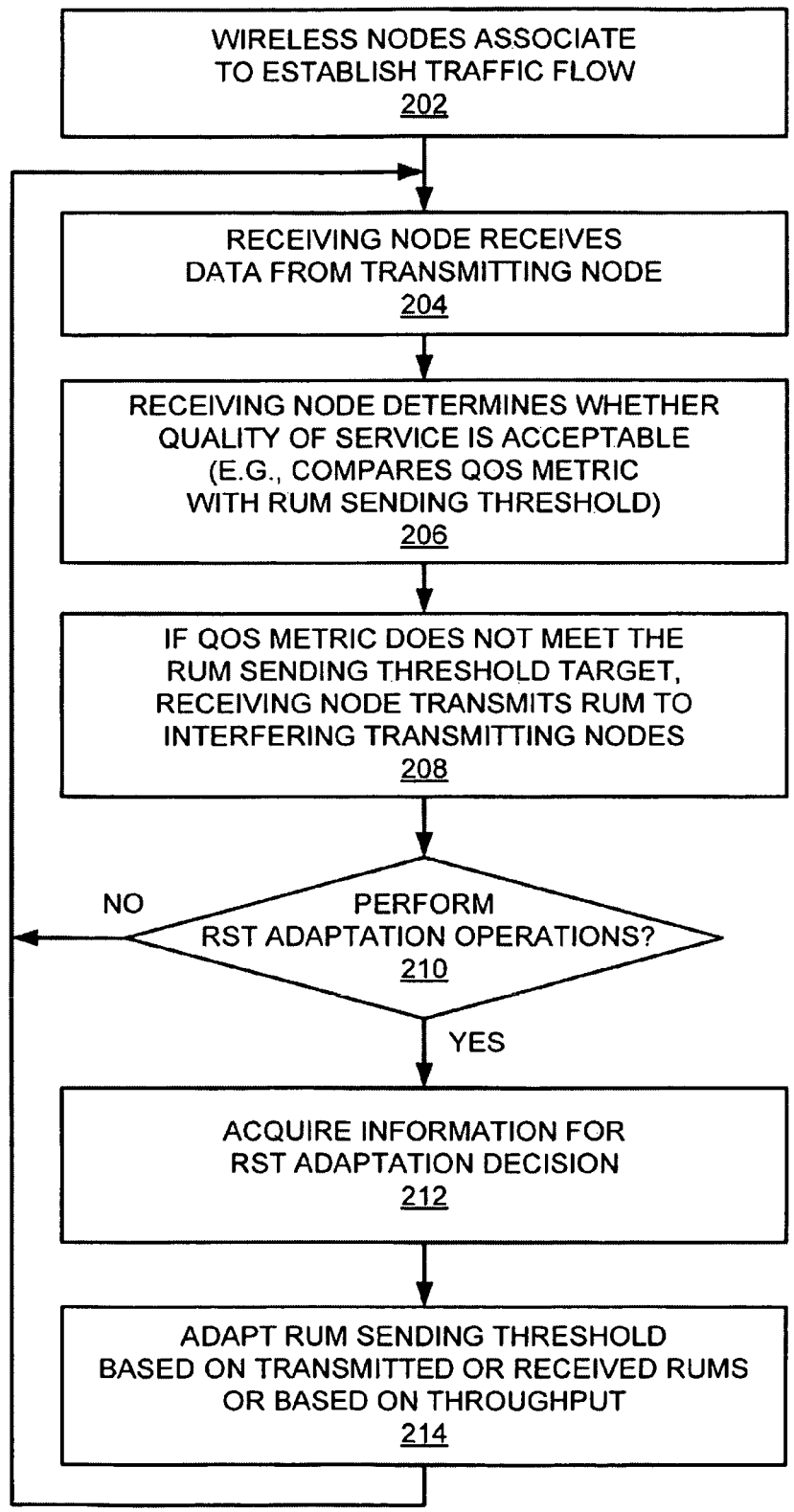
FIG. 2 is a flowchart of several sample aspects of interference mitigation operations that may be performed in conjunction with receiving data.
Figure 3:
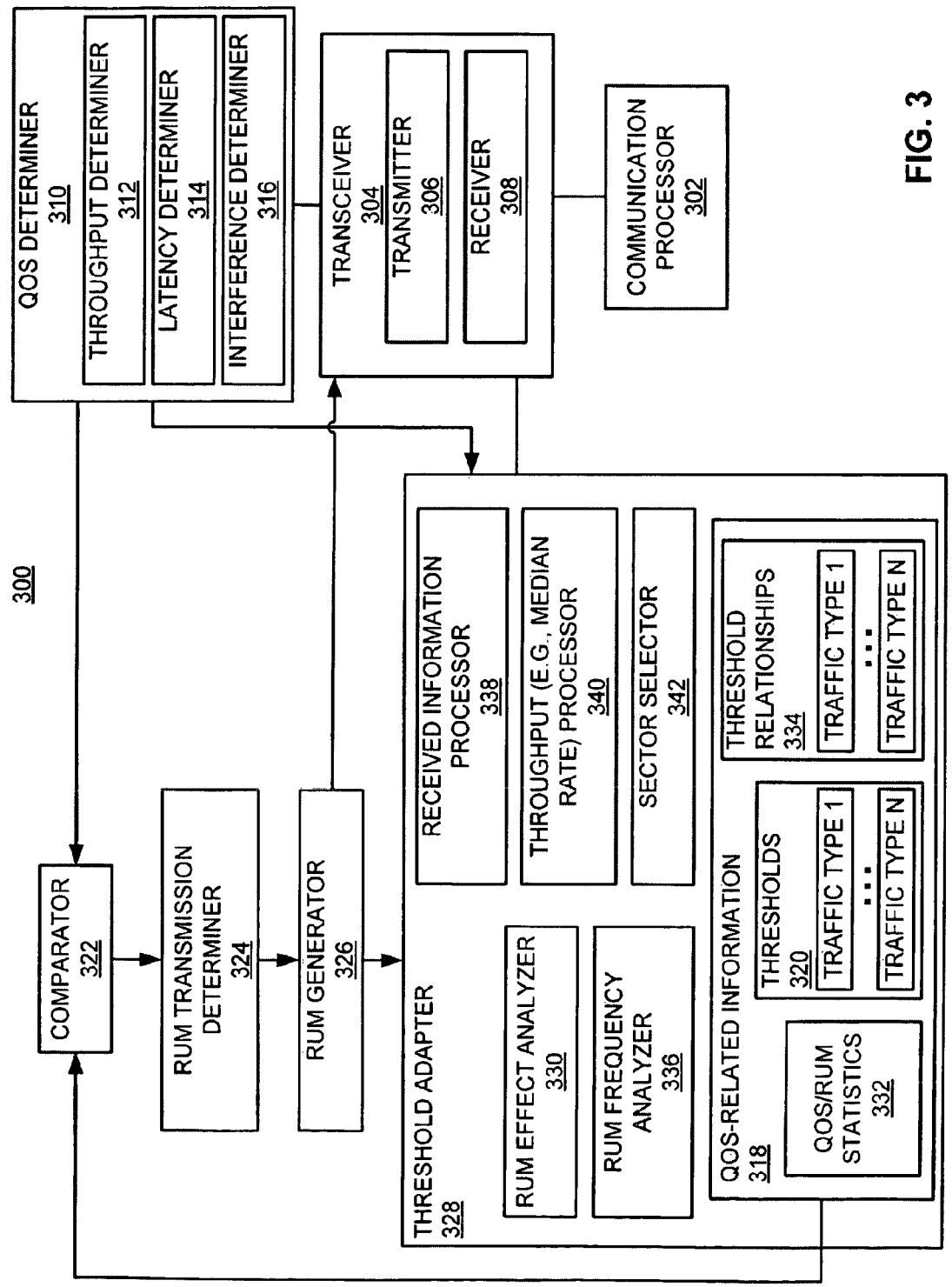
FIG. 3 is a simplified block diagram of several sample aspects of a receiving node.

Referring now to FIG. 2, the illustrated flowchart relates to several high-level operations that may be performed (e.g., by a receiving node) in conjunction with adapting RST. For convenience, the operations of FIG. 2 (or any other operations discussed or taught herein) may be described as being performed by specific components. For example, FIG. 3 illustrates sample components that may be employed in conjunction with receive operations of a node 300. It should be appreciated, however, that the described operations may be performed by other types of components and may be performed using a different number of components. For example, the threshold adaptation operations and components described herein may be implemented in an access point that sets the RST value or values for each of its associated nodes (e.g., access terminals). It also should be appreciated that one or more of the operations described herein may not be employed in a given implementation.

As represented by block 202 of FIG. 2, when a node of a system is within communication range of another node, the nodes may associate with one another to formally establish a communication session. In the example of FIG. 3, the wireless node 300 includes a communication processor 302 that cooperates with a transceiver 304 including transmitter and receiver components 306 and 308 to communicate with another wireless node. In this way, one or more traffic flows may be established from one node (e.g., node 102C in FIG. 1) to another node (e.g., node 104B).

Blocks 204-208 of FIG. 2 relate to RUM generation operations that a node (e.g., an access point or access terminal) may perform in conjunction with the reception of data. Here, a node may repeatedly (e.g., continually, periodically, etc.) monitor the quality of service of its received data and transmit a RUM whenever the monitored quality of service level falls below a desired quality of service level.

As represented by block 204, a receiving node (e.g. node 104B) receives data from an associated transmitting node (e.g. node 102C). As discussed above, the received data may be associated with one or more links and/or flows.

As represented by block 206, the receiving node may determine whether it is receiving data in accordance with a desired quality of service level. For example, it may be desirable for a node to receive data associated with a given type of traffic at or above a given throughput rate (e.g., for video traffic), within a given latency period (e.g., for voice traffic), or without significant interference. In the example of FIG. 3, the node 300 includes a QoS determiner 310 configured to analyze data received by the receiver 308 to determine one or more quality of service-related parameters associated with the data. Accordingly, the QoS determiner 310 may comprise one or more of a throughput determiner 312 for calculating throughput of received data, a latency determiner 314 for calculating latency of received data, or an interference determiner 316 for estimating, for example, the amount of interference imparted on the received data. It should be appreciated that a QoS determiner may take other forms as well. Various techniques may be employed to monitor quality of service. For example, in some implementations a node may employ a sliding window scheme (e.g., a short term moving average) to monitor the level of quality of service of its received data on a relatively continual basis.

Here, a determination of whether a given level of quality of service is being achieved may be based on comparison of the quality of service information provided by the QoS determiner 310 with stored information 318 representative of a desired quality of service (e.g., a quality of service threshold 320). In FIG. 3, the QoS determiner 310 may generate a quality of service metric that indicates (e.g., provides an estimate of) the level of quality of service that is associated with received data over a given time period, a given number of packets, and so on. In addition, one or more threshold values 320 (e.g., RSTs) may define an expected quality of service level for a given type of traffic or for several different types of traffic. A comparator 322 may thus compare the current quality of service metric with a quality of service threshold 320 to determine whether the node 300 is receiving data at an acceptable level or whether the node 300 is disadvantaged in some way.

As represented by block 208 of FIG. 2, if a given quality of service level is not being met at a receiving node, the receiving node may transmit a RUM that indicates that the receiving node is disadvantaged to some degree. Here, the degree to which a node is disadvantaged may be indicated in a RUM weight. In the example of FIG. 3, a RUM transmission determiner 324 determines whether to transmit a RUM based on the comparison performed by the comparator 322. If a decision is made to transmit a RUM, a RUM generator 326 may determine the appropriate weight for the RUM and cooperate with the transmitter 306 to send the RUM. In some implementations, a RUM weight may be defined as a quantized value of a ratio of the desired quality of service (e.g., corresponding to an RST) and a quality of service metric relating to the quality of service that is actually achieved.

In some aspects all of the RUMs in a system (e.g., a given network) may be transmitted at a constant power spectral density ("PSD") or at a constant power. This may be the case regardless of the normal transmit power of a given node. In this way, RUMs may be received at potentially interfering (e.g., higher power) transmitting nodes that are relatively far away, irrespective of whether the RUM-sending node is a lower power node or a higher power node. In other words, the RUM decoding range may be defined to be substantially equal to or greater than the largest transmit interference range to be controlled by the system.

A transmitting node that receives a RUM may determine an appropriate course of action based on the receipt of the RUM, as well as the weight thereof. For example, if a transmitting node (e.g., node 102D in FIG. 1) determines that a non-associated receiving node (e.g., node 104B) is more disadvantaged than a receiving node (e.g., node 104C) associated with that transmitting node, the transmitting node may elect to abstain from transmitting or may reduce its transmit power during one or more designated timeslots to avoid interfering with the non-associated receiving node. Thus, by limiting its transmission at certain times, a transmitting node may improve C/I at a neighboring RUM-sending node.

Alternatively, in the event the transmitting node determines that its associated receiving node is more disadvantaged than any other receiving nodes that sent RUMs, the transmitting node may ignore the RUMs from the non-associated nodes. In this case, the transmitting node may elect to transmit during a given timeslot.

As represented by block 210, a node (e.g., an access terminal, an access point, or an access point on behalf of an access terminal) may adapt the node's RST at some point in time. For example, as discussed in more detail below, a decision to adapt the RST may be based on a node's own analysis of traffic in the system. Also, a node's decision to adapt the RST may be based on messages received from another node in the system relating to that other node's analysis of system traffic.

As represented by block 212, in some aspects the node 300 may include a threshold adapter 328 that acquires information to be used to determine whether to adapt the quality of service information 318 (e.g., RST 320). For example, the threshold adapter 328 may monitor transmitted RUMs, monitor quality of service information, and process messages received from other nodes. Here, monitoring quality of service information may include, for example, acquiring (e.g., determining) a node's own quality of service statistics, acquiring threshold rate information from associated nodes, or acquiring threshold rate information from non-associated wireless sectors.

Figure 5:
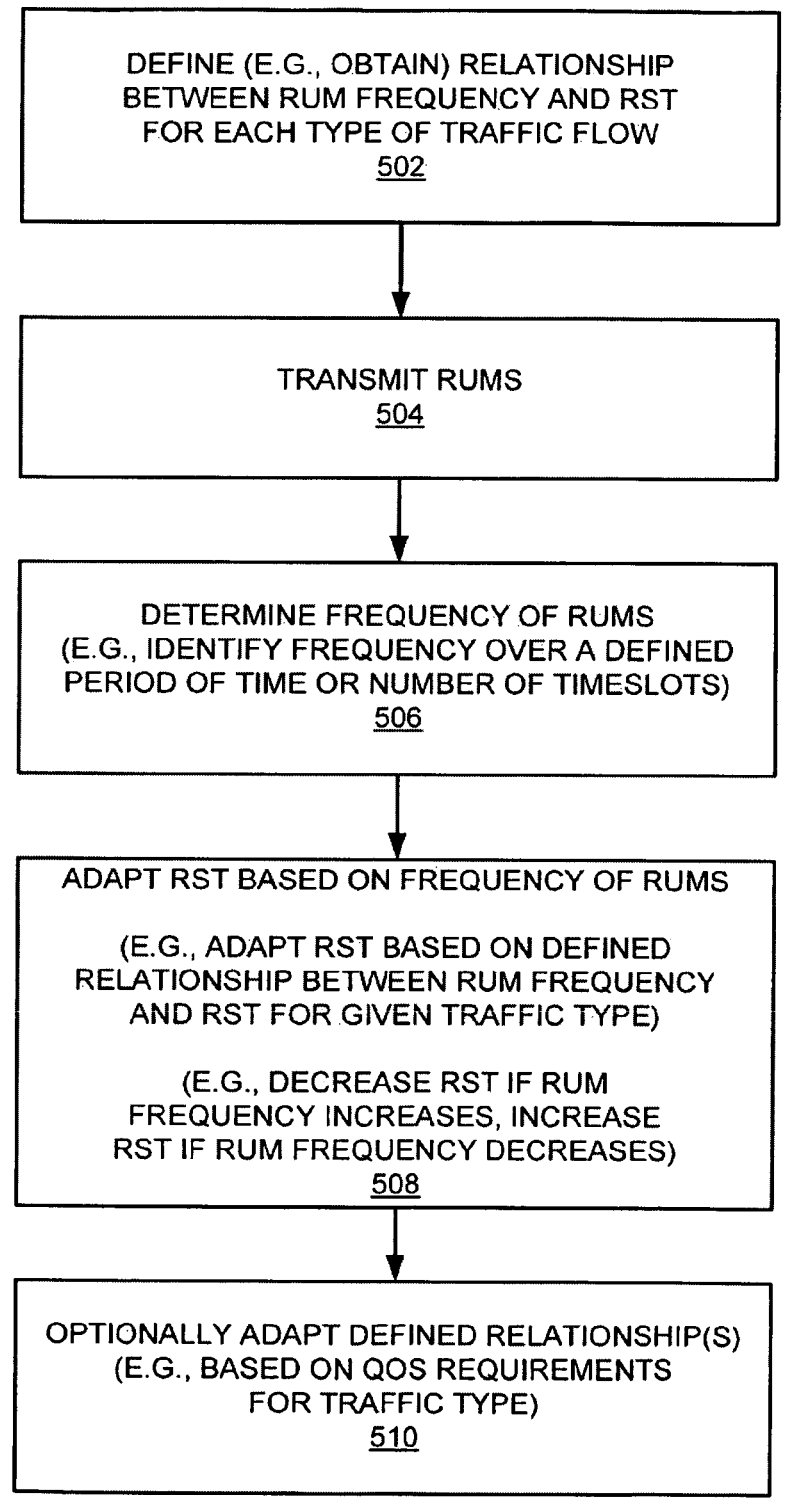
FIG. 5 is a flowchart of several sample aspects of operations that may be performed to adapt a quality of service threshold based on a frequency of resource utilization messages.
Figure 6:
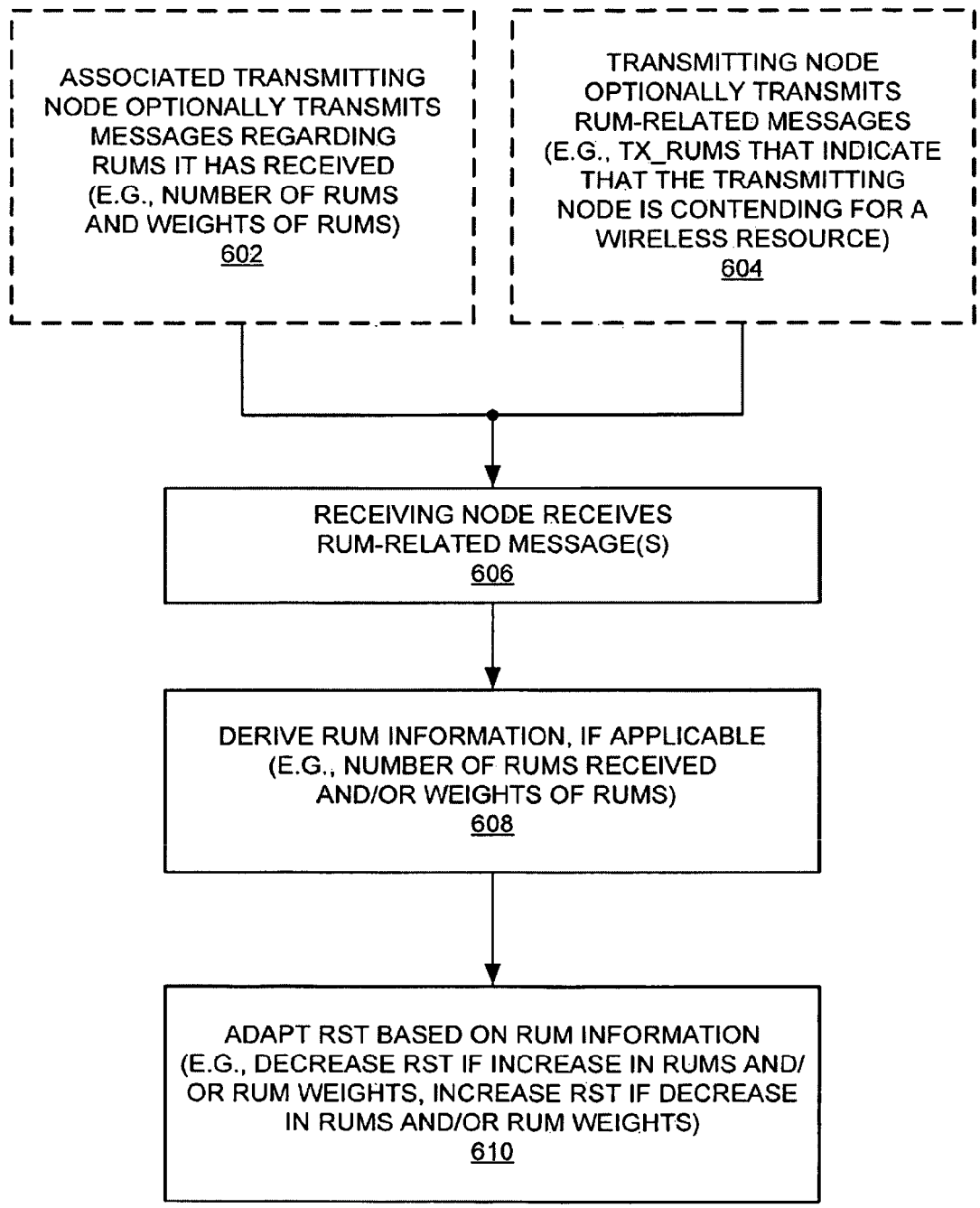
FIG. 6 is a flowchart of several sample aspects of operations that may be performed to adapt a quality of service threshold based on resource utilization message information received from a wireless node.
Figure 8:
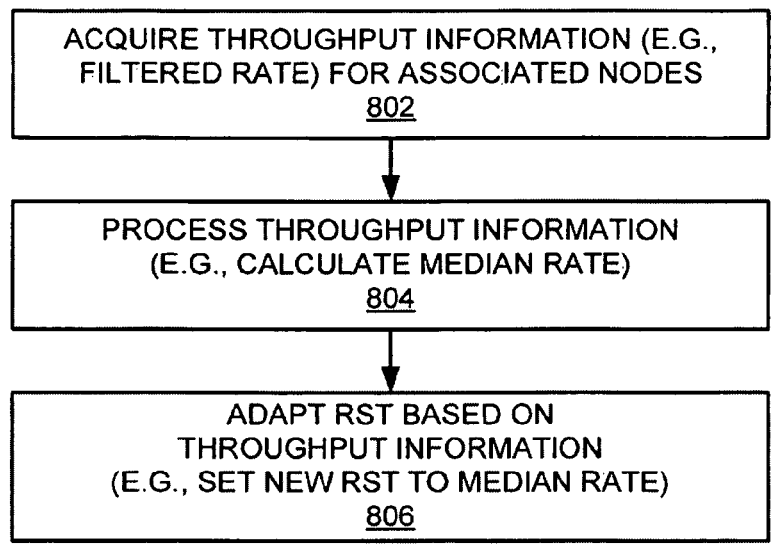
FIG. 8 is a flowchart of several sample aspects of operations that may be performed to adapt a quality of service threshold based on local throughput.
Figure 10A:
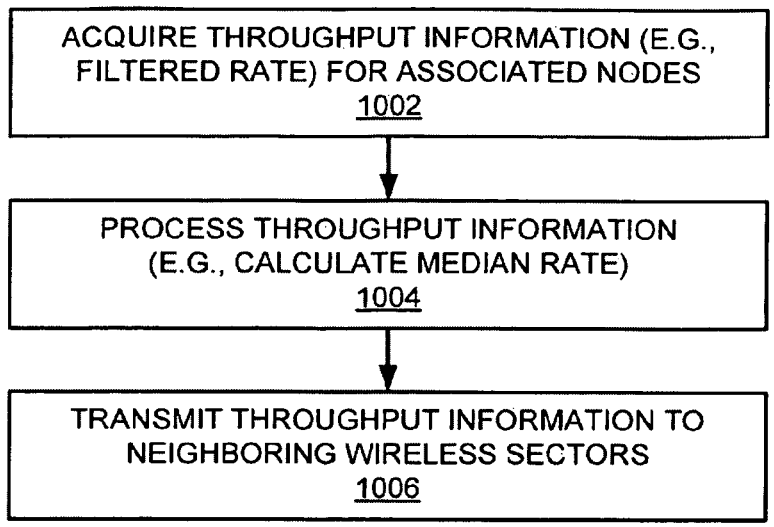
FIGS. 10A and 10B are flowcharts of several sample aspects of operations that may be performed to adapt a quality of service threshold based on shared throughput input information.
Figure 10B:
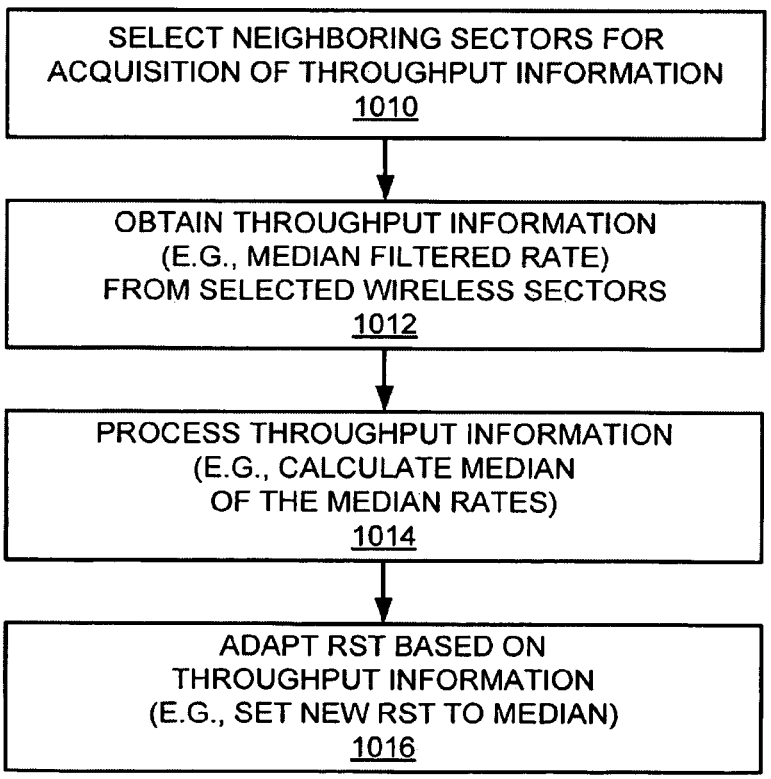

As represented by block 214, the threshold adapter 328 may then adapt the RST based on the acquired information. The RST for a given node may be adapted in various ways and may be adapted based on various criteria. Several examples of RST adaptation schemes will now be described in conjunction with the operations of FIGS. 4-6. Specifically, FIG. 4 relates to adapting RST based on the effect of prior RUMs. FIG. 5 relates to adapting RST based on RUM frequency. FIG. 6 relates to adapting RST based on RUM-related information received from another node. FIG. 8 relates to adapting RST based on throughput information of associated nodes. FIGS. 10A-B relate to adapting RST based on throughput information of neighboring wireless sectors.

Figure 4:
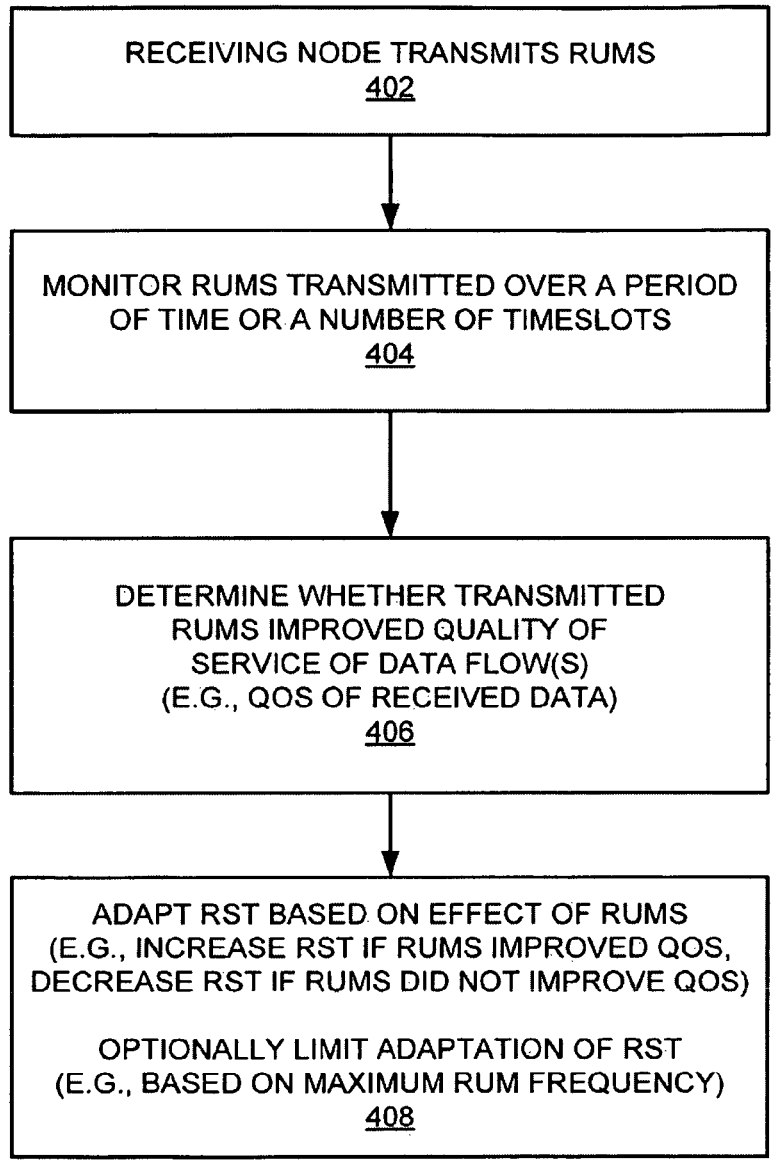
FIG. 4 is a flowchart of several sample aspects of operations that may be performed to adapt a quality of service threshold based on an effect of transmitted resource utilization messages.

Referring initially to the operations of FIG. 4, in some cases transmitting a large number of RUMs may be beneficial to system performance while in other cases the transmission of a large number of RUMs may indicate that the RUMs are relatively ineffective. As an example of the latter cases, while sending a RUM may improve the interference environment for a current transmission, the transmission of RUMs by one node may cause other nodes to also send RUMs, thereby reducing the number of transmission opportunities in the system.

In conjunction with determining whether to send RUMs, a node may consider the effect of past RUMs on the resultant quality of service to gain a better sense of the overall system behavior. Based on this feedback from the system, the node may then adapt its RST in an attempt to improve system performance.

In some aspects, a node may consider the effect that its transmission of RUMs has on the quality of service of its received data. For example, if a node is sending RUMs and the throughput for the node is increasing, it may be beneficial for the node to send more RUMs (e.g., by increasing its RST). Conversely, if a node is sending RUMs and there is no increase or a decrease in throughput, the node may decrease its RST to decrease the rate at which the node sends RUMs. The flowchart of FIG. 4, illustrates several aspects of operations that a node may perform in conjunction with adapting RST based on the effect of one or more RUMs.

As represented by block 402, a receiving node (e.g., node 300) may transmit RUMs whenever it determines that it is disadvantaged to some degree. As discussed above, this determination may be based on comparison of a quality of service metric for received data with an RST. Thus, under certain conditions, a receiving node may transmit a series of RUMs over a period of time.

As represented by block 404, the receiving node may monitor a set (e.g., one or more) of its RUM transmissions. For example, the threshold adapter 328 may monitor transmitted RUMs over a period of time (e.g., a certain number of timeslots) or may collect RUM information for a given number of RUMs. In some implementations the threshold adapter 328 employs a sliding window (e.g., of a defined time period) for monitoring RUMs.

As represented by block 406, the receiving node determines the effect the transmission of RUMs has had on the quality of service of received data (e.g., one or more received data flows). To this end, the QoS determiner 310 may monitor received traffic and determine one or more quality of service metrics associated with that traffic. For example, the throughput determiner 312 may calculate or estimate the throughput of the received traffic. Similarly, the latency determiner 314 may calculate or estimate the latency of the received traffic. Also, the interference determiner may calculate or estimate interference (or potential interference) at the receiving node (e.g., by determine a received error rate, etc.). In a similar manner as discussed above, quality of service may be monitored over a sliding window or using some other suitable technique.

In some aspects, the quality of service monitoring (e.g., during a given time period) may coincide with or lag corresponding monitoring of the RUMs. In this way, an appropriate correlation may be maintained between the transmission of the RUMs and the monitored quality of service.

The receiving node also may maintain information about the quality of service information that is provided by the QoS determiner 310 or that is acquired in some other manner. For example, the threshold adapter 328 may maintain QoS metric statistics 332 relating to prior values of quality of service for one or more received flows and associated periods of time. Consequently, a RUM effect analyzer 330 may determine how quality of service has been affected by comparing the current quality of service information with previous quality of service information. For example, the RUM effect analyzer 330 may generate an indication relating to whether the transmission of RUMs resulted in improvement, degradation, or no change in quality of service at the receiving node.

As represented by block 408, the threshold adapter 328 may adapt an RST 320 based on the effect the transmitted RUMs have on the corresponding quality of service. For example, if the transmission of RUMs improved quality of service, the threshold adapter 328 may increase the RST 320. In this way, the receiving node may be configured to send more RUMs since the sending of RUMs has improved the reception of data at the node.

In contrast, if the transmission of RUMs has little or no effect on the quality of service or has degraded the quality of service, the threshold adapter 328 may not change the RST 320 or may decrease the RST 320. In the latter case, since sending RUMs is not helping this particular node, the node may be configured to send fewer RUMs thereby giving other nodes in the system more opportunities to transmit their data.

An example of an algorithm for adapting an RST is set forth in Equation 1. In this example the prior QoS metric (before sending any RUMs) is designated $R_{old}$ and the resultant QoS metric (after sending one or more RUMs) is $R_{new}$. $RST_{original}$ represents the RST (e.g., the level of quality of service) that is originally desired while $RST_{old}$ is the prior value of RST (e.g., after a prior adaptation of RST). $RST_{new}$ is the newly updated value for RST. Finally, γ is a hysteresis parameter (e.g. γ=0.1) that may be used to prevent too frequent updates of RST.

If $R_{new} > R_{old} \times (1+\gamma)$, set $RST_{new} = RST_{old} \times (1+\delta)$, where $0 < \delta < 1$.     EQUATION 1

Here, $RST_{new}$ may be constrained to the minimum of $RST_{new}$ and $RST_{original}$.

The node then continues sending RUMs based on the new value of RST.

Else if $R_{old} < R_{new} \leq R_{old} \times (1+\gamma)$, RST is maintained at the same value.

The node thus continues sending RUMs based on the prior RST value.

Else (i.e. $R_{new} \leq R_{old}$), set $RST_{new} = RST_{old} \times (1-\delta)$, where $0 < \delta < 1$.

The node then continues sending RUMs based on the new value of RST.

In some implementations, one or more limits (e.g., bounds) may be placed on an RST value. For example, in some cases the adaptation of an RST may be constrained so that the RST value does not fall below a certain value (e.g., a defined minimum value). In this way, an attempt may be made to maintain a certain minimum level of service for the node. In addition, in some cases the adaptation of an RST may be constrained so that the RST value does not increase above a certain value (e.g., a defined maximum value). For example, the RST value may be set to prevent the node from transmitting RUMs at a rate that exceeds a maximum RUM frequency. In this way, an attempt may be made to ensure that the available wireless resources are fairly shared among the contending nodes. Also, the imposition of upper and lower bounds on the RST values for a system may facilitate convergence (e.g., cause faster convergence) of the RST values being adapted by the nodes in the system.

Referring now to FIG. 5, in some implementations a node may adapt an RST based on a frequency at which the node transmits RUMs. In some aspects, the frequency with which a node sends out RUMs indicates the feasibility of its RST values. For example, if the node sends out RUMs only occasionally, the flows on its links may be achieving their RST targets with the help of RUMs. On the other hand, a node that perpetually sends out RUMs is not achieving RST, and may need to adapt its RST to a more reasonable value.

As represented by block 502, in some implementations RST adaptation may be based on one or more relationships that are defined (e.g., at the system level or at a node) between RUM frequency and RST values. Such a relationship may involve, for example, associating a first RUM frequency value with a first RST value, a second RUM frequency with a second RST value, and so on. In some implementations a node may adapt an RST based on an RST adaptation curve that defines, for example, a relatively continuous relationship between RUM frequency and RST values. In some implementations different relationships may be defined for different traffic types (e.g., data flow types). In other words, different RST adaptation schemes may be used for different types of traffic. Information 334 (FIG. 3) relating to these relationships may then be stored for use during subsequent threshold adaptation operations.

Figure 7:
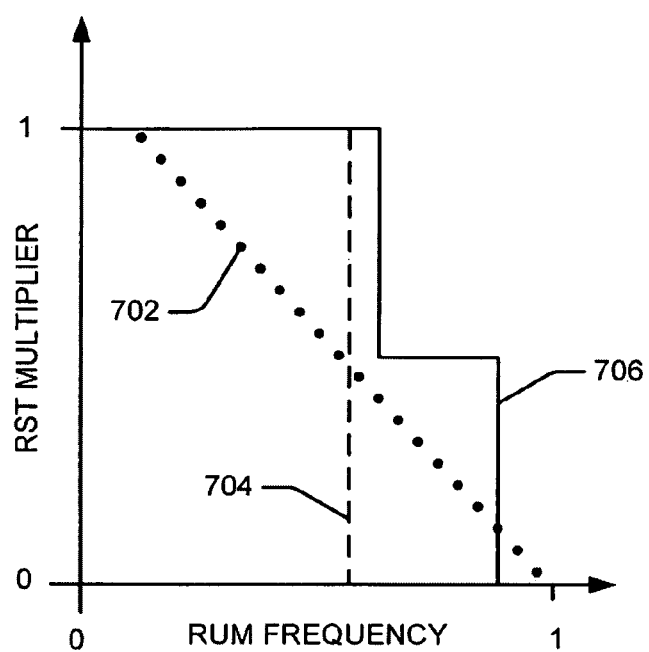
FIG. 7 is a simplified diagram illustrating several sample RST adaptation curves.

FIG. 7 illustrates several examples of RST adaptation curves. As mentioned above, the manner in which an RST is adapted may depend on the type of traffic flow associated with that RST. For example, as shown in FIG. 7, different types of flows may be associated with different RST adaptation curves, each of which describes the elasticity of the RST for that flow.

In some aspects, RST adaptation for a flow may be characterized by two parameters: an initial RST value and an RST adaptation curve. As its name suggests, an initial RST value may be the RST that is initially defined for a flow. In some implementations, this initial value is defined as the mean traffic rate that the flow is expected to have. A few examples follow. A full-buffer traffic curve may be associated with an initial RST of 800 kbps. Voice traffic sending 400 byte packets every 40 ms may have an initial RST of 80 kbps. A video stream may have an initial RST of, for example, 1 Mbps.

As shown in FIG. 7, an RST adaptation curve may plot the RUM frequency versus an RST multiplier. The shape of this curve denotes the elasticity of the RST for this flow, and determines its sensitivity with respect to the RUM frequency. Several examples again follow. A dotted line 702 represents a curve for a full-buffer flow (e.g., data applications such as web browsing, e-mail, etc.) that is relatively elastic to the congestion feedback. In this case, when the RUM frequency is relatively high, the flow may still exist even when the RST is reduced considerably. As mentioned above, a voice-based flow (e.g., voice-over-IP) generally requires that its quality of service be met. For example, the RST of a voice flow may be totally inelastic, as exemplified by the step-function shape of the dashed line 704 in FIG. 7. A line 706 represents an example of a two-rate video flow that may operate at two different RST levels, but is otherwise inelastic.

In FIG. 7, the values for RST and RUM frequency are normalized. For example, the initial RST value may be normalized b/s/Hz, over a 20 MHz channel.

The RST adaptation curves in the example of FIG. 7 have a ceiling of 1, indicating, for example, that the RSTs of these flows do not exceed the initial RST value. This may be the case in implementations where the initial RST value is the minimum throughput that is desired for a flow. Here, there may be no need to increase the RST beyond this since, if there is no congestion, the flow may exceed its RST throughput anyway. On the other hand, when the RST is unachievable, the node adapts the RST lower. The node may then raise the RST at a later point in time in the event the congestion subsides.

It should be appreciated that an RST adaptation curve may be defined in various ways. For example, in some implementations (e.g., when the RST value is being set by the network), the RST multiplier may be adapted to a value greater than 1.

Referring again to FIG. 5, after one or more flows are established at a node, the node may transmit RUMs as discussed herein (block 504). In the example of FIG. 3, the threshold adapter 328 may monitor this RUM traffic, for example, as discussed above in conjunction with FIG. 4

As represented by block 506, a RUM frequency analyzer 336 may determine a current RUM frequency from a set of the transmitted RUMs. For example, the RUM frequency analyzer 336 may use a sliding window (e.g., over a period of time) to provide a current value for the RUM frequency.

In some implementations the RUM frequency may be calculated according to Equation 2:

$$f_R := w_R \cdot f_R + (1-w_R) \cdot z,\qquad \text{EQUATION 2}$$

where z=0 if no RUM was transmitted,
z=1 if a RUM was transmitted, and
$0 \leq w_R \leq 1$ Here, the RUM frequency $f_R$ is a filtered value of the RUM bit z indicating whether a RUM was sent out or not. In some cases, the RUM frequency $f_R$ is initialized to 0 to provide an initial warm-up period when no RUMs are sent out.

It should be appreciated that $f_R$ may be calculated in a variety of ways. For example, the RUM frequency analyzer 336 may simply count the number of RUMs sent out during a given number of timeslots (e.g., the last 100 timeslots).

In some implementations the RST adaptation algorithm may follow a much slower timescale than RUMs. In this case, the filter weight $w_R$ may be defined as a value that is close to 1. For example, in some implementations a node may set $w_R = 0.99$.

As represented by block 508, the RUM frequency (e.g., the filtered $f_R$ value) may then be used to adapt the RST. Here, the threshold adapter 328 may use a threshold relationship 334 (e.g., RST adaptation curve information) corresponding to a given flow to determine the RUM value to be used based on the current RUM frequency. For example, given the RUM frequency, the actual value of a flow's RST may be calculated by looking up the RST multiplier from the adaptation curve, and multiplying the RST multiplier by the initial RST value.

As the curve 702 of FIG. 2 illustrates for certain types of flows, an increase in the RUM frequency may result in the selection of a lower RST value, while a decrease in the RUM frequency may result in the selection of a higher RST value. Thus, a node may lower or raise an RST value based on the current availability of system resources. For example, a node may raise the RST of flows that it had previously suppressed in the event the congestion that caused the decrease in the RST value has subsided.

As mentioned above, a given node may concurrently support multiple links and/or flows. In this case, a node may send out a RUM with a weight that is a function of the RST on all the node's children links and/or flows, and the quality of service that they receive. Thus, a node may employ a single RUM that reflects the status of all the links and flows at that node.

In some implementations, the weight of the RUM indicates the flow and/or link with the worst quality of service performance. Consequently, the RUM frequency may be used to adapt the RST of the worst link or flow associated with a given node.

It should be appreciated that adaptation of RST values may be accomplished in various ways. For example, in an implementation that uses a flow-based RST, a node may independently adapt the RST of all the flows on a given link. Conversely, in some implementations the RST value for a link may comprise the sum of the RST values for those flows. In this case, the RUM frequency may be used to look up the adapted RST values for each flow, whereby these RST values are added to define the new RST for the link.

In a similar manner as discussed above, in some implementations adaptation of an RST value may be limited. For example, in some cases a minimum and/or maximum value may be defined for the RST. In addition, in some cases a minimum and/or maximum value may be defined for RUM frequency (thereby potentially limiting the adaptation of the RST to some degree).

With reference to Table 1, an example RST adaptation process will now be described in more detail. In this example, three nodes (nodes 1-3) are transmitting to another node (node 0) via links 1-3, respectively. At timeslot 0, the quality of service on link 1 and the quality of service on link 2 are below their respective RST targets. Consequently, node 0 will send out a RUM. The RUM weight ("RUMwt") corresponds to the worst link, which is link 1 in this example. Here, the RUM weight is defined as RST/QoS.

As mentioned above, in some implementations the RST adaptation algorithm may update the RST for link 1 alone in this case. Upon adaptation, link 1 may not remain the worst link, and any other link which is also causing RUMs will have its own RST updated in turn (e.g., as in timeslot 2).

An alternative strategy is to adopt the RST of all links at a receiver, every time. While this is may be computationally more expensive, it also may provide better performance.

TABLE 1

| Time | RUM | $f_R$ | Link 1 | | | Link 2 | | | Link 3 | | |
|---|---|---|---|---|---|---|---|---|---|---|---|
| | | | RST | QoS | RUMwt | RST | QoS | RUMwt | RST | QoS | RUMwt |
| 0 | | 0.6 | .4 | .2 | 2 | .4 | .3 | 1.33 | .4 | .6 | .67 |
| 1 | 1 | 0.61 | .3 | .25 | 1.2 | .4 | .3 | 1.33 | .4 | .6 | .67 |
| 2 | 1 | 0.62 | .3 | .25 | 1.2 | .3 | .4 | .75 | .4 | .6 | .67 |
| 3 | 1 | 0.63 | .2 | .3 | .67 | .3 | .4 | .75 | .4 | .5 | .8 |
| 20 | 0 | 0.3 | .2 | .3 | .67 | .3 | .4 | .75 | .5 | .7 | .71 |

Each row of Table 1 lists the current value of the RUM (e.g., 1=RUM sent and 0=RUM not sent) and the RUM frequency. The RUM frequency may be used to adapt the RST on the worst link. In Table 1, the parameters for each link that is adapted are shown italicized and bolded. When a RUM is sent out, the link is likely to get a high throughput. Consequently, the quality of service for the link may increase, even as its RST is updated. The last row (timeslot 20) represents a later point in time and is provided to demonstrate how the RST may be adapted upwards when the RUM frequency has reached a low number.

Referring again to FIG. 5, as represented by block 510, in some implementations the defined relationships 334 may be dynamically adapted. For example, in the event the quality of service requirement for a given type of traffic changes, a corresponding RST adaptation curve may be changed. Such an adaptation may include, for example, adjusting the position of a vertical line of the curve 704 or the curve 706, or changing a slope of the curve 702.

It should be appreciated that an RST maybe adapted based on various types of information that may be available in a wireless communication system. For example, referring now FIG. 6, in some implementations a node may adapt its RST based on information the node receives from another node.

As represented by block 602, in some implementations a transmitting node that has associated with a receiving node may send information to the receiving node that the receiving node may use to adapt an RST. For example, the transmitting node may transmit information relating to the number RUMs it has received and corresponding weights of those RUMs. Such information may be useful, for example, to inform the receiving node of the reason it has not received transmissions from the transmitting node (e.g., due to the reception of higher priority RUMs at the transmitting node). The receiving node may then use this information to determine whether it needs to adjust its RST to improve its quality of service or to allow some other node or nodes to have more access to system resources.

As represented by block 604, in some implementations a transmitting node that desires to transmit may send another form of resource utilization message to inform neighboring receiving nodes that the transmitting node is contending for a wireless resource (e.g., a timeslot). This form of resource utilization message may be referred to herein as a TX_RUM since it originates from a transmitting node.

In some implementations a transmitting node may transmit a TX_RUM based on the node's analysis of RUMs that it has received from neighboring receiving nodes. For example, a transmitting node may send a TX_RUM if it determines that its associated receiving node is more disadvantaged that the other receiving nodes that send RUMs. Thus, in some aspects a TX_RUM provides information relating to information the transmitting node has obtained (e.g., heard) from the system.

In some aspects a receiving node may use receipt of a TX_RUM to determine to which associated transmitting node it will listen. For example, in the event a receiving node has established flows with multiple transmitting nodes, the nodes may use the TX_RUM mechanism enable the receiving node to more effectively schedule data from one of the associated transmitting nodes. In addition, the receiving node may use the TX_RUM information it receives to determine how to adapt its RSTs. For example, in the event transmissions from a given node are currently disadvantaged, the receiving node may adapt any RSTs associated with that node in an attempt to receive more traffic from that node.

It should be appreciated that the TX_RUM may be received by receiving nodes that have not associated with the node that transmitted the TX_RUM. In this case, a receiving node may use knowledge of the received TX_RUMs to determine how to set its RST (e.g., to receive more or less traffic from an associated transmitting node).

As represented by block 606, at some point in time a receiving node (e.g., node 300 in FIG. 3) may receive one or more RUM-related messages from one or more transmitting nodes. For example, the receiving node may receive one of the messages discussed above in conjunction with blocks 602 and 604.

As represented by block 608, if applicable, the receiving node (e.g. a received information processor 338 of FIG. 3) may derive RUM-related information from a received message. For example, the received information processor 338 may collect statistics relating to the quantity of resource utilization messages that have been received (e.g., over a period of time) and the weights of those resource utilization message. The received information processor 338 may then store information 332 (e.g., statistics concerning the number of RUMs and the RUM weights) relating to (e.g., comprising) the received RUM-related information.

As represented by block 610, the threshold adapter 328 may adapt an RST based on the RUM-related information 332. For example, based on the number and weight of the RUMs received by a receiving node's associated transmitting node (e.g., based on a trend relating to this information), the receiving node may elect to raise an RST to improve the quality of service of an associated flow. As a specific example, the RST may be increased in the event the weights of the RUMs are relatively low or there are relatively few RUMs. Conversely, the receiving node may elect to lower an RST to reduce the quality of service of an associated flow based on this RUM-related information (e.g., the current trend). For example, the RST may be decreased in the event the weights of the RUMs are relatively high or there are a large number of RUMs.

In the event a receiving node is receiving a large number of TX_RUMs, the node may lower its RST (e.g., to enable the transmitting node to have more access to the system resources). Conversely, if the receiving node is not receiving a large number of TX_RUMs the node may raise its RST.

Equation 3 illustrates an example of an algorithm that may be employed when receipt of TX_RUMs is used to determine the extent of congestion in the system.

$$R_{target}(n+1) = \begin{cases} \min(R_{target}(n) + \delta, R_{target}^{max}) & \text{if no neighbor } TX \\ & \text{RUM heard} \\ \max(R_{target}(n) - \delta, R_{target}^{min}) & \text{otherwise} \end{cases} \quad \text{EQUATION 3}$$

In this example, a "neighbor" TX_RUM refers to a TX_RUM from a transmitting node that is not associated with this receiving node. This algorithm allows a receiving node to be more aggressive in requesting collision avoidance when congestion is low (as represented by the fact that no "neighbor" TX_RUMs were heard) and more conservative when congestion is high.

Referring now to FIGS. 8 and 10, in some aspects an RST may be adapted based on throughput information. For example, FIG. 8 relates to adapting an RST based on local throughput (e.g., the throughput of the nodes within a given wireless sector). FIGS. 10A-B relate to adapting RST by taking into account throughput of one or more neighboring wireless sectors. Here, each wireless sector may comprise, for example, an access point and its associated access terminals.

Referring initially to FIG. 8, as represented by block 802, a wireless node acquires throughput information associated with a set of associated wireless nodes (e.g., the nodes of a given wireless sector). For example, an access point may monitor the flows of its associated nodes (e.g., access terminals) to determine the rate at which data is transmitted by or received at each node. In some aspects, a component such as the throughput determiner 312 of FIG. 3 may be used to acquire the throughput information.

Such a throughput rate may be determined in various ways. For example, in some cases the throughput rate may comprise an average rate over a period of time. In some cases the throughput rate may comprise a running average. In some cases the throughput rate may comprise a filtered rate (e.g., the rate over a given number of timeslots).

As represented by block 804, the wireless node (e.g., a throughput processor 340 of FIG. 3) may process the acquired throughput information in some manner. For example, in some aspects this may involve calculating at least one statistic relating to (e.g., the median of) the rates (e.g., the filtered rates) associated with a given wireless sector obtained at block 802.

As represented by block 806, the wireless node (e.g., the threshold adapter 328 of FIG. 3) may then adapt an RST value based on the throughput information. For example, the RST may be set to the median value calculated at block 804.

In some implementations the adapted RST value may be used for all of the wireless nodes in a sector. For example, the access point may send the new RST value to each of its associated wireless nodes. In this way, each sector (e.g., cell, service set, or some other set of nodes) in a system may attempt to improve the throughput of the nodes that have a throughput rate below the median throughput rate. Here, upon adaptation of the RST, the nodes in the sector that had lower throughput may now achieve higher throughput since the RST may be set higher than their current throughput. In other words, these disadvantaged nodes may send RUMs more frequently due to the new RST value. Conversely, the nodes in the sector that had higher throughput may lose some throughput since the RST may be set lower than their current throughput. That is, these higher throughput nodes may send RUMs less frequently due to the new RST value.

Figure 9:
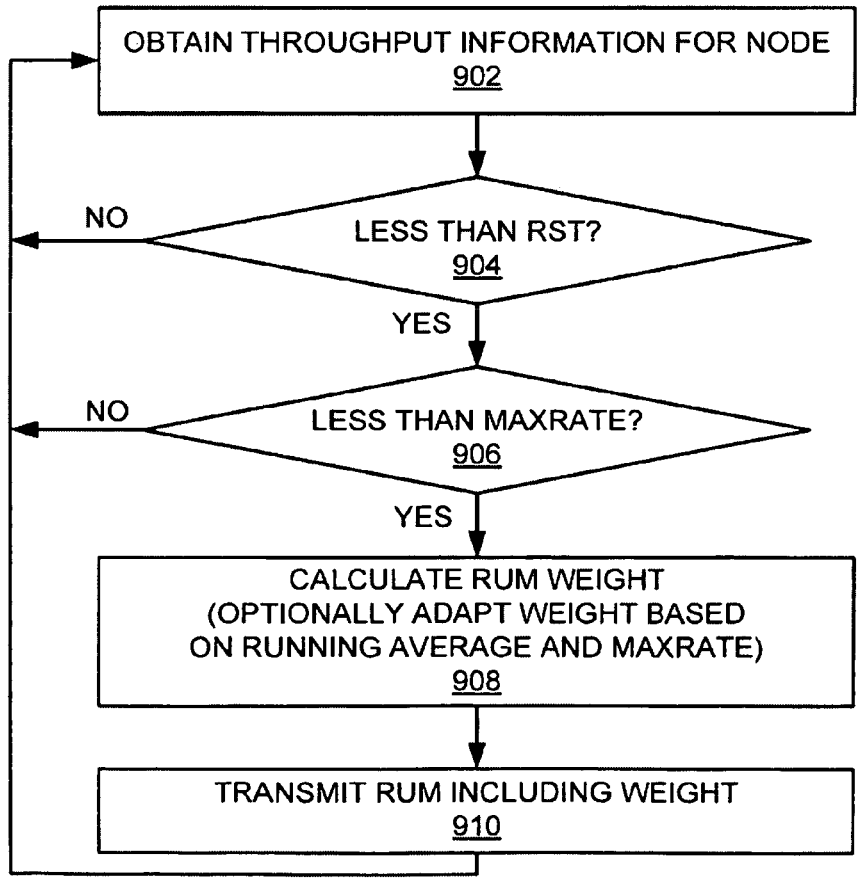
FIG. 9 is a flowchart of several sample aspects of operations that may be performed in conjunction with transmitting a resource utilization message.

FIG. 9 illustrates an example of how a given wireless node may use the new RST value to determine whether to transmit a RUM. As represented by block 902, the wireless node obtains information regarding its throughput (e.g., an average throughput rate for received data).

As represented by blocks 904 and 906, the throughput information is compared with the new RST and a maximum rate parameter ("MAXRATE"). If the throughput is less than (or less than or equal to) both of these parameters, the wireless node may transmit a RUM. Otherwise, the wireless node may continue monitoring its throughput (e.g., as discussed herein).

The maximum rate parameter may be employed to ensure that nodes that have a relatively high throughput do not transmit RUMs. For example, the maximum rate parameter may be defined at a value that represents a higher than average throughput rate. Thus, as long as the throughput of a node is achieving or exceeds that defined rate, the wireless node will not transmit a RUM. A maximum rate also may be defined based on other criteria. For example, the maximum rate may be based on the amount a given user of a wireless node pays for use of that node (e.g., a subscription fee). Thus, different maximum rates may be assigned to different wireless nodes under different circumstances.

As represented by block 908, in the event a RUM is to be sent, the wireless node (e.g., the RUM generator 326 of FIG. 3) may calculate a weight for the RUM. As discussed herein a weight may be calculated by dividing a throughput value (e.g., corresponding to QoS of received data) by the RST value. In this case, a lower weight value indicates that the wireless node is more disadvantaged.

In some aspects a weight may be adapted to favor a disadvantaged node. For example, Equation 4 illustrates an example of an algorithm where the RUMs for nodes that have a lower running average throughput rate ("running_average") are assigned a lower weight than nodes that have a higher running average. Here, the numerator portion (i.e., the new RST value) of the RUM weight formula set forth below is adjusted depending on the value of Δ which depends, in turn, on the running average. Here, Δ may be constrained to a negative value by not allowing a RUM to be sent if the running average greater than or equal to the maximum rate.

$$\Delta = \log(\text{running\_average}/\text{MAXRATE})$$

$$RUM\,\text{weight} = \text{throughput}/(RST^*(1-\Delta)) \quad \text{EQUATION 4}$$

As represented by block 910, the wireless node transmits the RUM, along with the weight value. The wireless node may then continue monitoring its throughput as discussed herein.

Referring now to FIGS. 1A-B, in some aspects RST may be adapted based on shared throughput input information statistics. For example, wireless sectors (e.g., the access points of neighboring sectors) may share their respective throughput information so that each wireless sector may adapt its RST value(s) based on this shared throughput input information.

FIG. 10A illustrates operations that each wireless sector may perform to share its throughput information. As represented by block 1002, a wireless node acquires throughput information associated with a set of associated wireless nodes (e.g., the nodes of a given wireless sector). For example, an access point may monitor the flows of its associated nodes (e.g., access terminals) to determine the rate at which data is transmitted by or received at each node. In some aspects, a component such as the throughput determiner 312 may be used to acquire the throughput information.

As represented by block 1004, the wireless node (e.g., the throughput processor 340) may process the acquired throughput information in some manner. For example, in some aspects this may involve calculating at least one statistic relating to (e.g., the median of) the rates (e.g., the filtered rates) associated with a given wireless sector obtained at block 1002.

As represented by block 1006, the wireless node may then transmit its throughput information (e.g., the median rate) so that neighboring sectors may acquire this information. In some cases a wireless node may periodically transmit this information (e.g., at a slower rate than RUMs are transmitted, on average). In some cases a wireless node may transmit this information with a RUM.

FIG. 10B illustrates operations that each wireless sector may perform to adapt an RST value based on throughput information acquired from other wireless sectors. For convenience, these operations will be described as being performed by an access point of a given sector.

As represented by block 1010, an access point (e.g., a sector selector 342 of FIG. 3) may optionally select the sectors from which it will receive throughput information. For example, an access point may decide to not acquire throughput information from any sectors that the access point does not interfere with. In some cases, such an interference determination may be based on whether the access point obeys RUMs received from a node of the sector. In some cases a decision to obey a RUM may, in turn, be based on a probability function. For example, if an access point obeys RUMs from another sector with a probability of 0.5, half of the time the access point may obey the RUMs and half of the time the node may not obey the RUMs. Accordingly, a decision to acquire throughput information from a selected sector may be based on whether there exists at least one wireless node in the selected sector such that the RUM-obey probability of the access point for a RUM from the wireless node is greater than or equal to a defined value (e.g., 0.5).

As represented by block 1012, the access point acquires (e.g., periodically acquires) the throughput information that is transmitted by one or more other wireless sectors. As mentioned above, in some aspects this information comprises at least one statistic relating to (e.g., the median) throughput values provided by each of the sectors (e.g., as in block 1006). In the example of FIG. 3, a component such as the throughput determiner 312 may be used to acquire this throughput information.

As represented by block 1014, the access point (e.g., the throughput processor 340) may process the acquired throughput information in some manner. For example, in some aspects this may involve calculating a statistic (e.g., the median) of the median rates (e.g., the filtered rates) obtained at block 1012 and the median rate of the access point's sector (e.g., as calculated at block 1004).

As represented by block 1016, the access point (e.g., the threshold adapter 328) may then adapt an RST value based on the throughput information. For example, the RST may be set to the median calculated at block 1014. The access point may then send the new RST value to each wireless node of the access point's sector. The wireless nodes may thus use the new RST value to determine whether to transmit a RUM (e.g., as in FIG. 9).

Through the use of the above RST adaptation scheme, each sector may attempt to improve the throughput of any wireless nodes that have a throughput that falls below a median throughput calculated at block 1014. Here, after adaptation of the RST value, the nodes of a sector that had a lower median throughput may achieve higher throughput since the RST may be set higher than their current throughput. In other words, these nodes may send RUMs more frequently due to the new RST value. Conversely, the nodes in any sectors that had a higher median throughput may lose some throughput since the RST may be set lower than their current throughput. That is, these nodes may send RUMs less frequently due to the new RST value.

Figure 11:
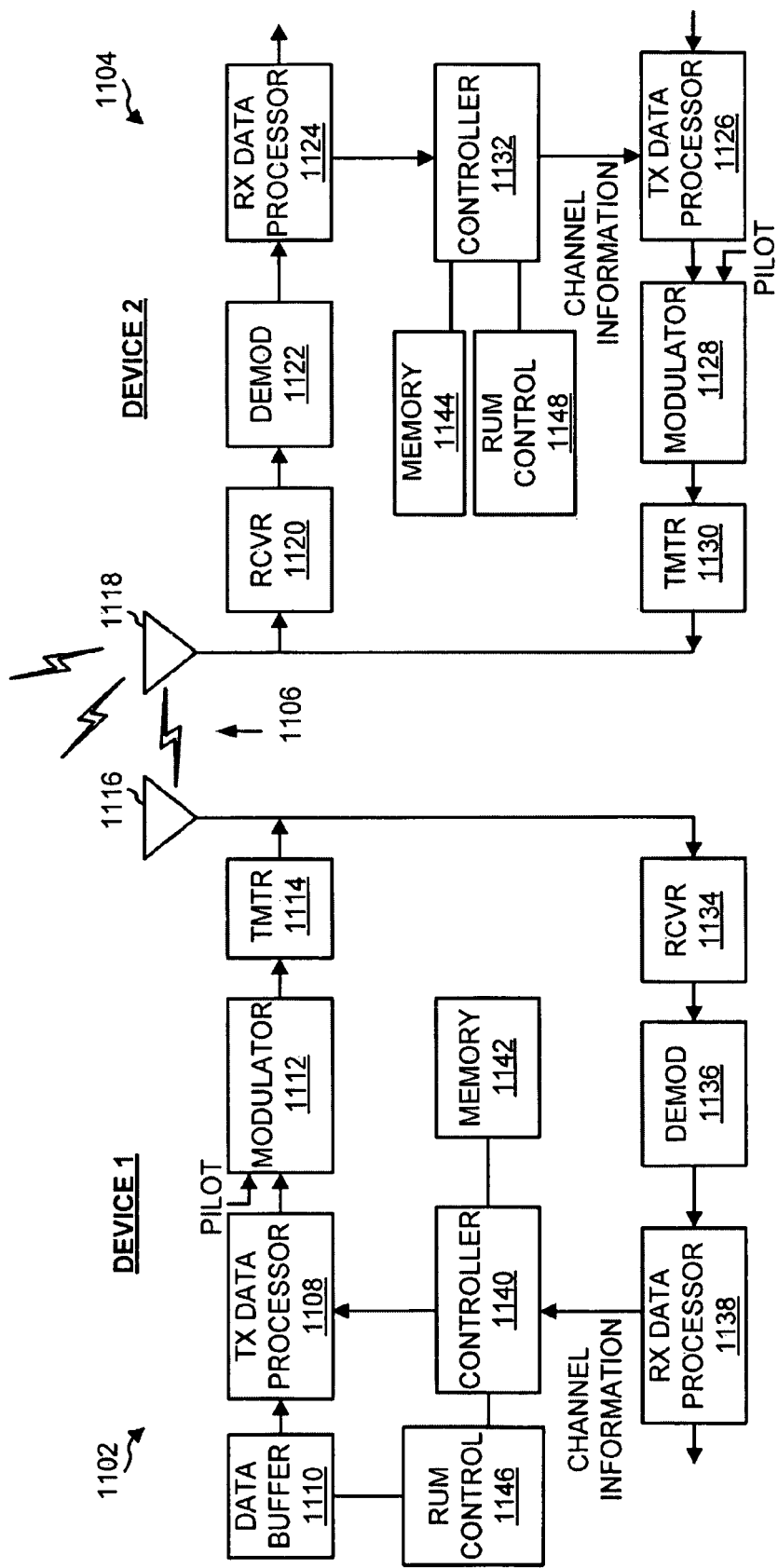
FIG. 11 is a simplified block diagram of several sample aspects of communication components.

The teachings herein may be incorporated into a device employing various components for communicating with at least one other wireless device. FIG. 11 depicts several sample components that may be employed to facilitate communication between devices. Here, a first device 1102 (e.g., an access terminal) and a second device 1104 (e.g., an access point) are adapted to communicate via a wireless communication link 1106 over a suitable medium.

Initially, components involved in sending information from the device 1102 to the device 1104 (e.g., a reverse link) will be treated. A transmit ("TX") data processor 1108 receives traffic data (e.g., data packets) from a data buffer 1110 or some other suitable component. The transmit data processor 1108 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1112 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1114 processes (e.g., converts to analog, filters, amplifies, and frequency upconverts) the output chip stream and generates a modulated signal, which is then transmitted from an antenna 1116.

The modulated signals transmitted by the device 1102 (along with signals from other devices in communication with the device 1104) are received by an antenna 1118 of the device 1104. A receiver ("RCVR") 1120 processes (e.g., conditions and digitizes) the received signal from the antenna 1118 and provides received samples. A demodulator ("DEMOD") 1122 processes (e.g., demodulates and detects) the received samples and provides detected data symbols, which may be a noisy estimate of the data symbols transmitted to the device 1104 by the other device(s). A receive ("RX") data processor 1124 processes (e.g., symbol demaps, deinterleaves, and decodes) the detected data symbols and provides decoded data associated with each transmitting device (e.g., device 1102).

Components involved in sending information from the device 1104 to the device 1102 (e.g., a forward link) will be now be treated. At the device 1104, traffic data is processed by a transmit ("TX") data processor 1126 to generate data symbols. A modulator 1128 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1130 and transmitted from the antenna 1118. In some implementations signaling for the forward link may include power control commands and other information (e.g., relating to a communication channel) generated by a controller 1132 for all devices (e.g. terminals) transmitting on the reverse link to the device 1104.

At the device 1102, the modulated signal transmitted by the device 1104 is received by the antenna 1116, conditioned and digitized by a receiver ("RCVR") 1134, and processed by a demodulator ("DEMOD") 1136 to obtain detected data symbols. A receive ("RX") data processor 1138 processes the detected data symbols and provides decoded data for the device 1102 and the forward link signaling. A controller 1140 receives power control commands and other information to control data transmission and to control transmit power on the reverse link to the device 1104.

The controllers 1140 and 1132 direct various operations of the device 1102 and the device 1104, respectively. For example, a controller may determine an appropriate filter, reporting information about the filter, and decode information using a filter. Data memories 1142 and 1144 may store program codes and data used by the controllers 1140 and 1132, respectively.

FIG. 11 also illustrates that the communication components may include one or more components that perform RUM-related operations as taught herein. For example, a RUM control component 1146 may adapt RSTs and cooperate with the controller 1140 and/or other components of the device 1102 to send and receive signals to another device (e.g., device 1104) as taught herein. Similarly, a RUM control component 1148 may adapt RSTs and cooperate with the controller 1132 and/or other components of the device 1104 to send and receive signals to another device (e.g., device 1102).

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., messages including control information and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data (e.g., data received in conjunction with transmission of one or more RUMs).

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 306 and receiver 308) that may include various components (e.g., signal generators and signal processors) that facilitate communication over a wireless medium.

Figure 12:
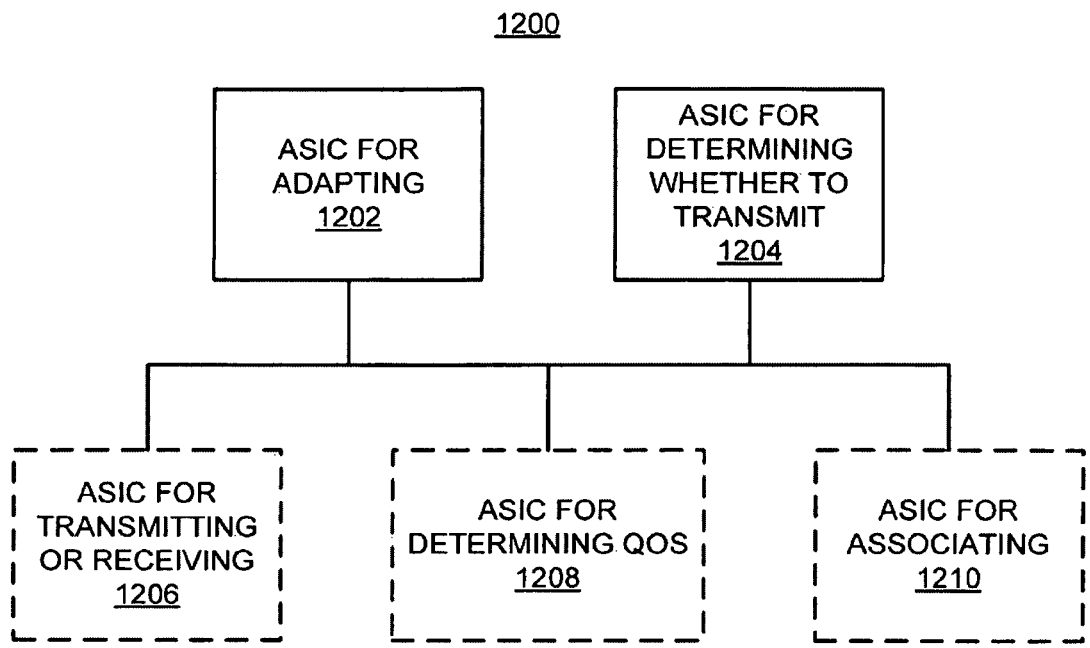
FIGS. 12 and 13 are simplified block diagrams of several sample aspects of apparatuses configured to adapt transmission of interference mitigation messages as taught herein.
Figure 13:
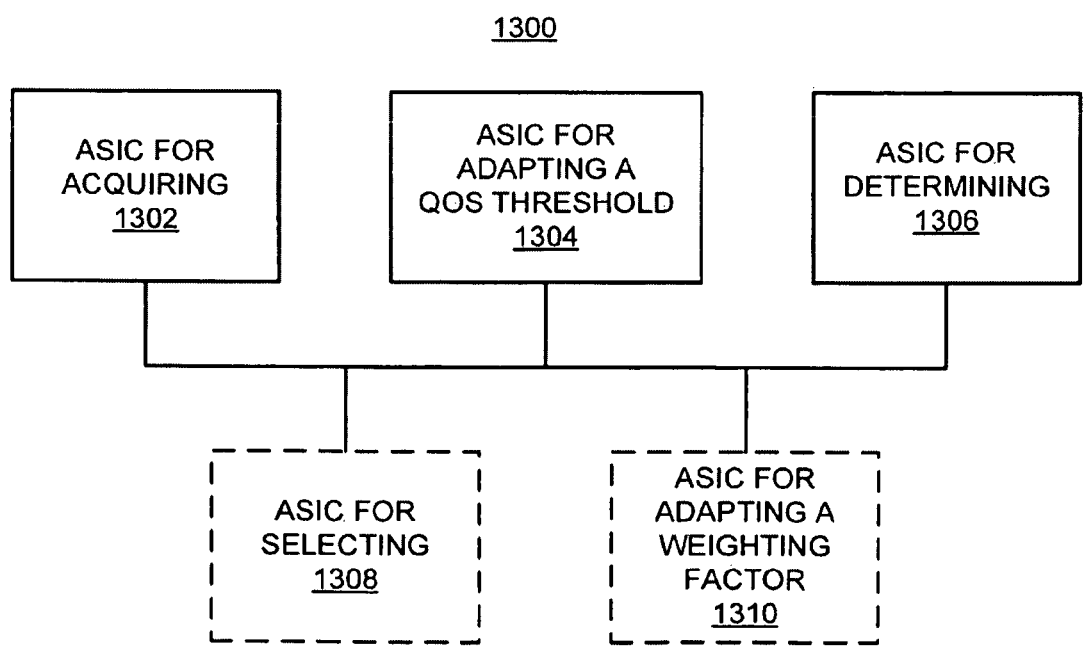

The components described herein may be implemented in a variety of ways. Referring to FIGS. 12 and 13, apparatuses 1200 and 1300 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1200 and 1300 may include one or more modules that may perform one or more of the functions described above with regard to various figures. For example, an ASIC for adapting 1202 may correspond to, for example, a threshold adapter as discussed herein. An ASIC for determining whether to transmit 1204 may correspond to, for example, a transmission determiner as discussed herein. An ASIC for transmitting or receiving 1206 may correspond to, for example, a transceiver as discussed herein. An ASIC for determining QoS 1208 may correspond to, for example, a QoS determiner as discussed herein. An ASIC for associating 1210 may correspond to, for example, a communication processor as discussed herein. An ASIC for acquiring 1302 may correspond to, for example, a throughput determiner as discussed herein. An ASIC for adapting a QoS threshold 1304 may correspond to, for example, a threshold adapter as discussed herein. An ASIC for determining 1306 may correspond to, for example, a transmission determiner as discussed herein. An ASIC for selecting 1308 may correspond to, for example, a sector selector as discussed herein. An ASIC for adapting a weighting factor 1310 may correspond to, for example, a RUM generator as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 900 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 9 as well as other components and functions described herein, may be implemented using any suitable means. Such means also may be implemented, at least in part, using corresponding structure as taught herein. For example, the components described above in conjunction with the "ASIC for" components of FIG. 9 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   acquiring, by an apparatus, throughput information that indicates at least one rate at which data was communicated by at least one wireless node associated with the apparatus;
   adapting, by the apparatus, a quality of service threshold that specifies a throughput rate, wherein the adaptation of the quality of service threshold is based on the throughput information;
   determining throughput associated with data received by the apparatus;

comparing the quality of service threshold with the determined throughput; and determining, by the apparatus, whether to transmit a resource utilization message to limit transmissions by at least one other apparatus that would otherwise interfere with reception at the apparatus, wherein the determination of whether to transmit the resource utilization message is based on whether the throughput associated with the received data is less than or equal to the quality of service threshold and is less than or equal to a defined maximum rate.

2. The method of claim 1, wherein the acquisition of throughput information comprises determining throughput rates of associated wireless nodes.

3. The method of claim 2, wherein the adaptation of the quality of service threshold comprises setting the quality of service threshold equal to a median of the throughput rates.

4. The method of claim 1, wherein the acquisition of throughput information comprises determining throughput rates of an associated wireless sector and at least one other wireless sector, wherein each wireless sector comprises a set of associated wireless nodes.

5. The method of claim 4, wherein the acquisition of throughput information comprises determining at least one throughput rate statistic of the at least one other wireless sector.

6. The method of claim 4, wherein the acquisition of throughput information comprises determining median throughput rates of the associated wireless sector and the at least one other wireless sector.

7. The method of claim 6, wherein the adaptation of the quality of service threshold comprises setting the quality of service threshold based on a median of the median throughput rates.

8. The method of claim 4, further comprising:
    determining whether to acquire a throughput rate from a selected wireless sector; and
    designating the selected wireless sector as one of the at least one other wireless sector based on the determination.

9. The method of claim 8, wherein the determination of whether to acquire the throughput rate of the selected wireless sector is based on a probability of responding to a resource utilization message from a wireless node of the selected wireless sector.

10. The method of claim 1, further comprising determining an average throughput associated with the received data, wherein:
    the resource utilization message comprises a weighting factor; and
    the weighting factor is adapted based on a comparison of the average throughput with the defined maximum rate.

11. The method of claim 10, further comprising increasing the weighting factor if there is a decrease in the average throughput.

12. An apparatus for wireless communication, comprising:
    a throughput determiner configured to acquire throughput information that indicates at least one rate at which data was communicated by at least one wireless node associated with the apparatus;
    a threshold adapter configured to adapt a quality of service threshold that specifies a throughput rate, wherein the adaptation of the quality of service threshold is based on the throughput information; and
    a transmission determiner configured to determine throughput associated with data received by the apparatus, compare the quality of service threshold with the determined throughput, and determine whether to transmit a resource utilization message to limit transmissions by at least one other apparatus that would otherwise interfere with reception at the apparatus, wherein the determination of whether to transmit the resource utilization message is based on whether the throughput associated with the received data is less than or equal to the quality of service threshold and is less than or equal to a defined maximum rate.

13. The apparatus of claim 12, wherein the acquisition of throughput information comprises determining throughput rates of associated wireless nodes.

14. The apparatus of claim 13, wherein the adaptation of the quality of service threshold comprises setting the quality of service threshold equal to a median of the throughput rates.

15. The apparatus of claim 12, wherein the acquisition of throughput information comprises determining throughput rates of an associated wireless sector and at least one other wireless sector, wherein each wireless sector comprises a set of associated wireless nodes.

16. The apparatus of claim 15, wherein the acquisition of throughput information comprises determining at least one throughput rate statistic of the at least one other wireless sector.

17. The apparatus of claim 15, wherein the acquisition of throughput information comprises determining median throughput rates of the associated wireless sector and the at least one other wireless sector.

18. The apparatus of claim 17, wherein the adaptation of the quality of service threshold comprises setting the quality of service threshold based on a median of the median throughput rates.

19. The apparatus of claim 15, further comprising a sector selector configured to:
    determine whether to acquire a throughput rate from a selected wireless sector; and
    designate the selected wireless sector as one of the at least one other wireless sector based on the determination.

20. The apparatus of claim 19, wherein the determination of whether to acquire the throughput rate of the selected wireless sector is based on a probability of responding to a resource utilization message from a wireless node of the selected wireless sector.

21. The apparatus of claim 12, wherein:
    the throughput determiner is further configured to determine an average throughput associated with the received data;
    the resource utilization message comprises a weighting factor; and
    the apparatus further comprises a resource utilization message generator configured to adapt the weighting factor based on a comparison of the average throughput with the defined maximum rate.

22. The apparatus of claim 21, wherein the resource utilization message generator is further configured to increase the weighting factor if there is a decrease in the average throughput.

23. An apparatus for wireless communication, comprising:
    means for acquiring throughput information that indicates at least one rate at which data was communicated by at least one wireless node associated with the apparatus;
    means for adapting a quality of service threshold that specifies a throughput rate, wherein the adaptation of the quality of service threshold is based on the throughput information;
    means for determining throughput associated with data received by the apparatus;

means for comparing the quality of service threshold with the determined throughput; and means for determining whether to transmit a resource utilization message to limit transmissions by at least one other apparatus that would otherwise interfere with reception at the apparatus, wherein the determination of whether to transmit the resource utilization message is based on whether the throughput associated with the received data is less than or equal to the quality of service threshold and is less than or equal to a defined maximum rate.

24. The apparatus of claim 23, wherein the acquisition of throughput information comprises determining throughput rates of associated wireless nodes.

25. The apparatus of claim 24, wherein the adaptation of the quality of service threshold comprises setting the quality of service threshold equal to a median of the throughput rates.

26. The apparatus of claim 23, wherein the acquisition of throughput information comprises determining throughput rates of an associated wireless sector and at least one other wireless sector, wherein each wireless sector comprises a set of associated wireless nodes.

27. The apparatus of claim 26, wherein the acquisition of throughput information comprises determining at least one throughput rate statistic of the at least one other wireless sector.

28. The apparatus of claim 26, wherein the acquisition of throughput information comprises determining median throughput rates of the associated wireless sector and the at least one other wireless sector.

29. The apparatus of claim 28, wherein the adaptation of the quality of service threshold comprises setting the quality of service threshold based on a median of the median throughput rates.

30. The apparatus of claim 26, further comprising means for selecting a sector by:
    determining whether to acquire a throughput rate from a selected wireless sector; and
    designating the selected wireless sector as one of the at least one other wireless sector based on the determination.

31. The apparatus of claim 30, wherein the determination of whether to acquire the throughput rate of the selected wireless sector is based on a probability of responding to a resource utilization message from a wireless node of the selected wireless sector.

32. The apparatus of claim 23, wherein:
    the means for acquiring determines an average throughput associated with the received data;
    the resource utilization message comprises the weighting factor; and
    the apparatus further comprises means for adapting the weighting factor based on a comparison of the average throughput with a defined maximum rate.

33. The apparatus of claim 32, wherein the means for adapting is configured to increase the weighting factor if there is a decrease in the average throughput.

34. A non-transitory computer-program product for wireless communication, comprising:
    computer-readable storage device comprising codes executable to:
    acquire, by an apparatus, throughput information that indicates at least one rate at which data was communicated by at least one wireless node associated with the apparatus;
    adapt, by the apparatus, a quality of service threshold that specifies a throughput rate, wherein the adaptation of the quality of service threshold is based on the throughput information;
    determine throughput associated with data received by the apparatus;
    compare the quality of service threshold with the determined throughput; and
    determine, by the apparatus, whether to transmit a resource utilization message to limit transmissions by at least one other apparatus that would otherwise interfere with reception at the apparatus, wherein the determination of whether to transmit the resource utilization message is based on whether the throughput associated with the received data is less than or equal to the quality of service threshold and is less than or equal to a defined maximum rate.

35. An access point, comprising:
    an antenna;
    a throughput determiner configured to acquire throughput information that indicates at least one rate at which data was communicated by at least one wireless node associated with the access point;
    a threshold adapter configured to adapt a quality of service threshold that specifies a throughput rate, wherein the adaptation of the quality of service threshold is based on the throughput information; and
    a transmission determiner configured to determine throughput associated with data received by the access point, compare the quality of service threshold with the determined throughput, and determine whether to transmit a resource utilization message via the antenna to limit transmissions by at least one apparatus that would otherwise interfere with reception at the access point, wherein the determination of whether to transmit the resource utilization message is based on whether the throughput associated with the received data is less than or equal to the quality of service threshold and is less than or equal to a defined maximum rate.

36. An access terminal, comprising:
    a throughput determiner configured to acquire throughput information that indicates at least one rate at which data was communicated by at least one wireless node associated with the access terminal;
    a threshold adapter configured to adapt a quality of service threshold that specifies a throughput rate, wherein the adaptation of the quality of service threshold is based on the throughput information;
    a transmission determiner configured to determine throughput associated with data received by the access terminal, compare the quality of service threshold with the determined throughput, and determine whether to transmit a resource utilization message to limit transmissions by at least one apparatus that would otherwise interfere with reception at the access terminal, wherein the determination of whether to transmit the resource utilization message is based on whether the throughput associated with the received data is less than or equal to the quality of service threshold and is less than or equal to a defined maximum rate; and
    a user interface configured to output an indication based on data received in conjunction with transmission of the resource utilization message.

\* \* \* \* \*